(12) United States Patent
Yokoyama et al.

(10) Patent No.: US 12,194,955 B2
(45) Date of Patent: Jan. 14, 2025

(54) SEAT BELT RETRACTOR

(71) Applicant: ASHIMORI INDUSTRY CO., LTD., Settsu (JP)

(72) Inventors: Taro Yokoyama, Settsu (JP); Satoshi Suminaka, Settsu (JP); Takayoshi Ijiri, Settsu (JP); Noriko Kurauchi, Settsu (JP); Eri Fujiwara, Settsu (JP); Daiki Hijikata, Settsu (JP)

(73) Assignee: ASHIMORI INDUSTRY CO., LTD., Settsu (JP)

( * ) Notice: Subject to any disclaimer, the term of this patent is extended or adjusted under 35 U.S.C. 154(b) by 0 days.

(21) Appl. No.: 18/600,052

(22) Filed: Mar. 8, 2024

(65) Prior Publication Data
US 2024/0300442 A1    Sep. 12, 2024

(30) Foreign Application Priority Data

Mar. 9, 2023  (JP) .................................. 2023-036422
Feb. 28, 2024  (JP) .................................. 2024-028049

(51) Int. Cl.
*B60R 22/46*  (2006.01)
*B60R 22/28*  (2006.01)
*B60R 22/343*  (2006.01)

(52) U.S. Cl.
CPC ........ *B60R 22/4676* (2013.01); *B60R 22/343* (2013.01); *B60R 2022/287* (2013.01); *B60R 22/4628* (2013.01)

(58) Field of Classification Search
CPC .............. B60R 22/343; B60R 22/4628; B60R 22/4676; B60R 2022/287
See application file for complete search history.

(56) References Cited

U.S. PATENT DOCUMENTS

| | | | | |
|---|---|---|---|---|
| 5,344,095 A * | 9/1994 | Frei | ...................... | B60R 22/4619 242/384.2 |
| 5,526,996 A * | 6/1996 | Ebner | ................. | B60R 22/4619 242/379.1 |
| 5,697,571 A * | 12/1997 | Dybro | ................. | B60R 22/4628 474/147 |
| 6,343,759 B1 * | 2/2002 | Specht | ................ | B60R 22/4676 242/390.8 |
| 6,419,176 B1 * | 7/2002 | Mizuno | ............... | B60R 22/4628 242/374 |

(Continued)

FOREIGN PATENT DOCUMENTS

| | | |
|---|---|---|
| JP | 2012-500158 A | 1/2012 |
| JP | 2016030451 A * | 3/2016 |
| WO | 2010/107075 A1 | 9/2010 |

*Primary Examiner* — Laura Freedman
(74) *Attorney, Agent, or Firm* — Sughrue Mion, PLLC

(57) ABSTRACT

A seat belt retractor includes a housing including a first side wall and a second side wall facing each other, a winding drum configured to wind up a webbing, a locking base, a torsion bar including one end side, which is opposite to the locking base, coupled to the winding drum without being rotatable relative to the winding drum, and the other end side coupled to the locking base without being rotatable relative to the locking base, a pretensioner including: a pretensioner casing attached to the first side wall; and a drive wheel attached to the locking base, a lock member located in the locking base, and a stopper member being screwed onto a male screw of the locking base.

8 Claims, 18 Drawing Sheets

(56) References Cited

U.S. PATENT DOCUMENTS

| | | | | |
|---|---|---|---|---|
| 7,427,044 | B2* | 9/2008 | Takamatsu | B60R 22/4676 |
| | | | | 242/382 |
| 7,429,012 | B2* | 9/2008 | Loffler | B60R 22/4628 |
| | | | | 297/475 |
| 7,753,305 | B2* | 7/2010 | Katayama | B60R 22/3413 |
| | | | | 242/384 |
| 9,079,565 | B2* | 7/2015 | Koprowicz | B60R 22/4676 |
| 10,017,150 | B2* | 7/2018 | Asako | B60R 22/36 |
| 10,525,932 | B2* | 1/2020 | Yoshioka | B60R 22/4628 |
| 10,723,311 | B2* | 7/2020 | Yanagawa | B60R 22/405 |
| 2007/0120002 | A1* | 5/2007 | Hori | B60R 22/4628 |
| | | | | 242/379.1 |
| 2010/0044489 | A1 | 2/2010 | Lombarte et al. | |
| 2012/0006928 | A1 | 1/2012 | Ono et al. | |
| 2022/0402457 | A1* | 12/2022 | Sakaguchi | B60R 22/4628 |
| 2024/0300441 | A1* | 9/2024 | Yokoyama | B60R 22/42 |
| 2024/0300443 | A1* | 9/2024 | Yokoyama | B60R 22/4676 |

\* cited by examiner

FIG. 4
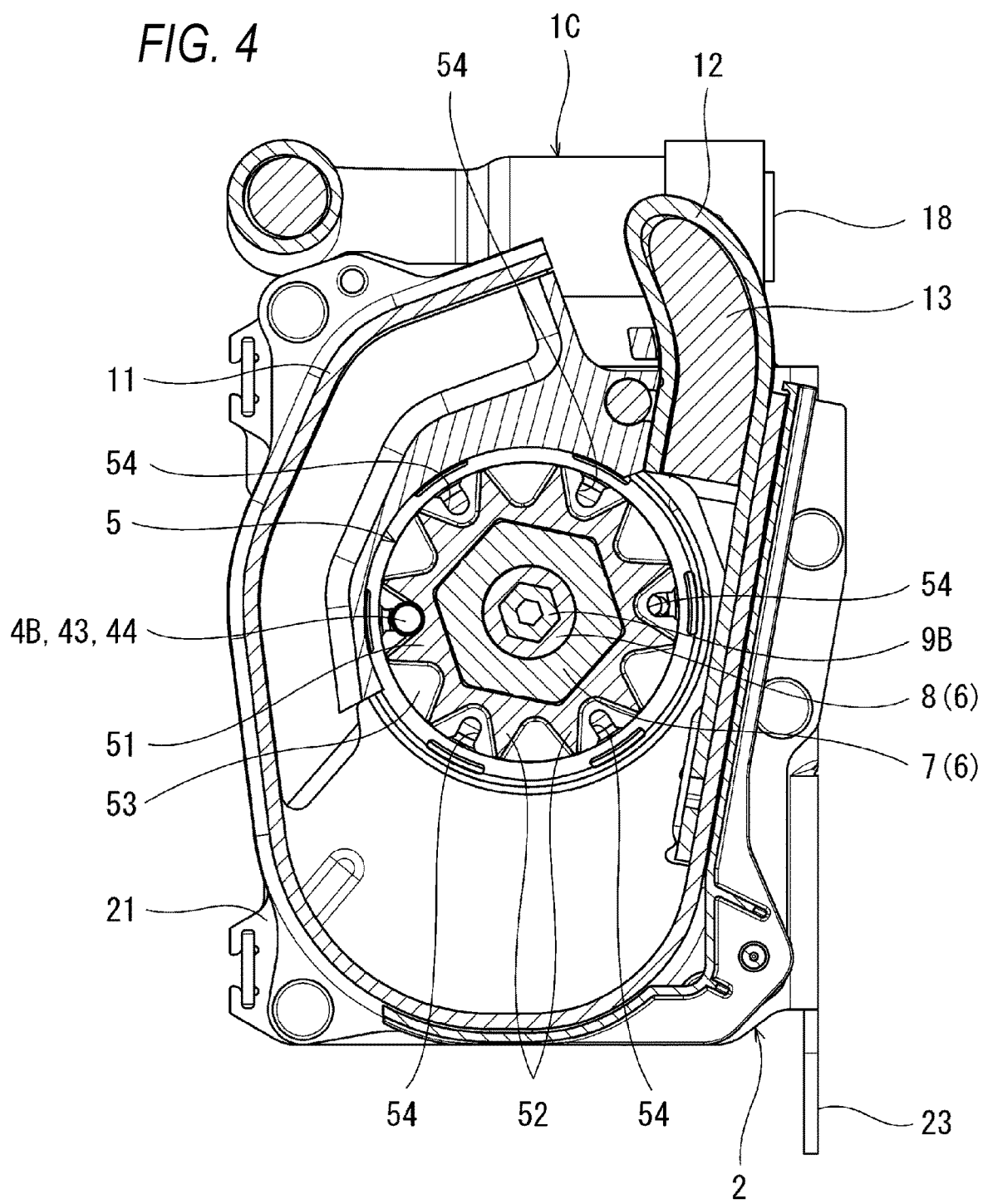
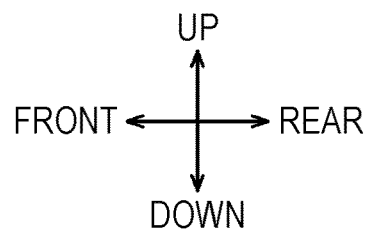

FIG. 5
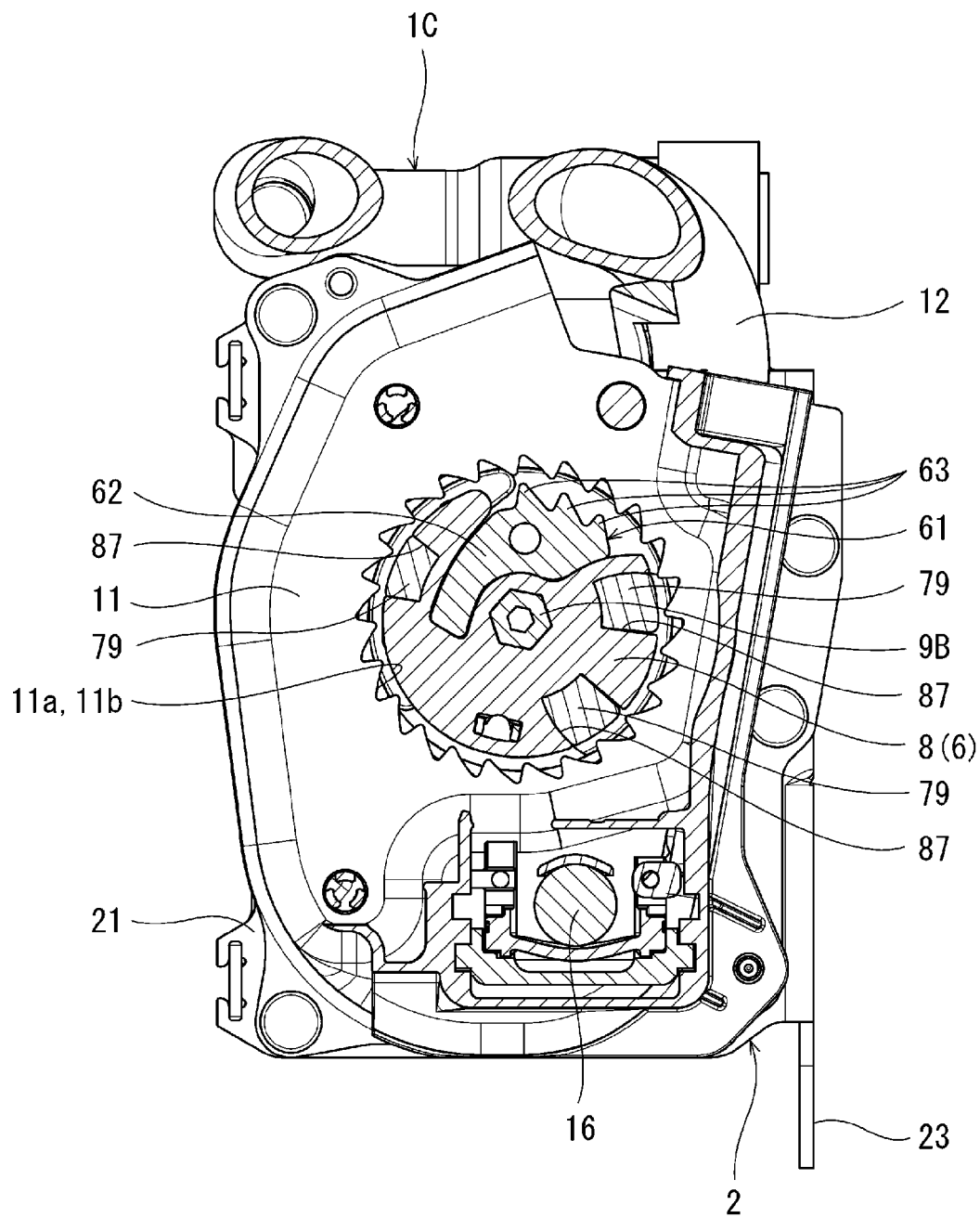
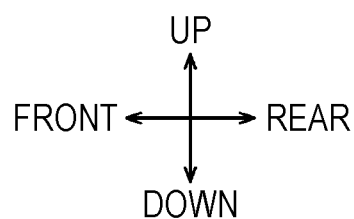

RIGHT ⟷ LEFT

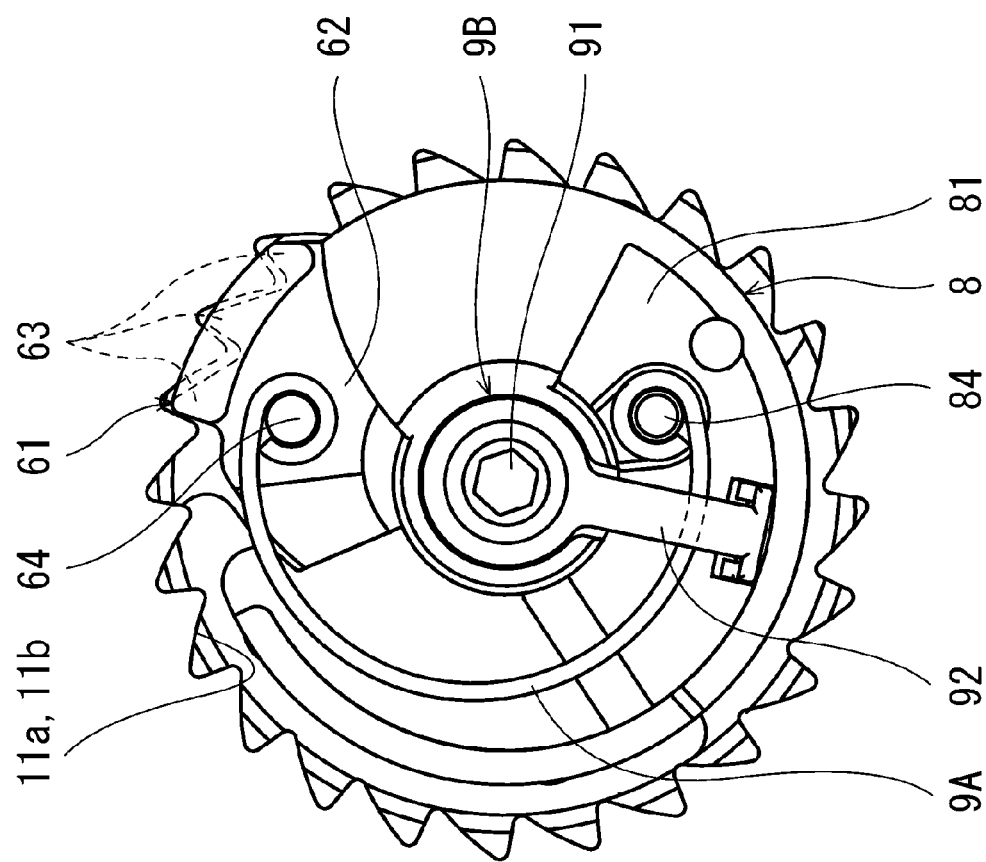

SEAT BELT RETRACTOR

CROSS-REFERENCE TO RELATED APPLICATIONS

This application is based on and claims priority under 35 USC 119 from Japanese Patent Application No. 2023-036422 filed on Mar. 9, 2023 and Japanese Patent Application No. 2024-028049 filed on Feb. 28, 2024, the entire content of which is incorporated herein by reference.

TECHNICAL FIELD

The present disclosure relates to a seat belt retractor capable of removing slack in a webbing and absorbing impact energy of an occupant in an emergency such as vehicle collision.

BACKGROUND ART

In the related art, there has been known a seat belt retractor that prevents a webbing from being pulled out, in an emergency of a vehicle. In the seat belt retractor, a winding drum configured to wind up the webbing is rotatably housed between a pair of side walls of a housing.

For example, WO2010/107075A1 discloses a seat belt retractor including a pretensioner configured to rotate a winding drum (referred to as a "spindle" in WO2010/107075A1) in a winding direction, and a torsion bar configured to absorb impact energy by plastic deformation caused by twisting, in an emergency of a vehicle.

Specifically, in the seat belt retractor disclosed in WO2010/107075A1, the winding drum has a center hole opened in one end surface, and a locking base (referred to as a "tread head" in WO2010/107075A1) is disposed to face the end surface. The torsion bar is inserted into the center hole of the winding drum, and has one end side, opposite to the locking base, coupled to the winding drum without being rotatable relative to the winding drum, and the other end side coupled to the locking base without being rotatable relative to the locking base.

Further, a stopper member (referred to as a "hexagonal nut" in WO2010/107075A1) is held in the center hole of the winding drum without being rotatable relative to the winding drum and so as to be movable in an axial direction of the winding drum. The locking base is formed with a male screw screwed with the stopper member. The stopper member defines an allowable amount of the relative rotation between the winding drum and the locking base in a case where the torsion bar absorbs the impact energy.

In the emergency of the vehicle, the rotation of the locking base in a pull-out direction is prevented, and in this state, in a case where a pull-out force of the webbing exceeds a predetermined value, the torsion bar is plastically deformed and the winding drum rotates relative to the locking base in the pull-out direction. At this time, the relative rotation between the winding drum and the locking base is restricted, to a predetermined amount, by the stopper member. Accordingly, when the impact energy is absorbed, a pull-out amount of the webbing is restricted, and an occupant is prevented from moving in a forward direction beyond a predetermined distance.

In the seat belt retractor of WO2010/107075A1, the pretensioner is disposed on the side opposite to the locking base, and JP2012-500158A discloses a seat belt retractor in which a pretensioner is disposed on the same side as a locking base. In the seat belt retractor of JP2012-500158A, a drive wheel of the pretensioner is attached to the locking base (referred to as a "tread head" in JP2012-500158A). However, the stopper member is not employed in the seat belt retractor of JP2012-500158A.

In the seat belt retractor of WO2010/107075A1, in order to change a position of the pretensioner to the same side as the locking base as in JP2012-500158A, it is necessary to attach the drive wheel to the locking base. However, in the seat belt retractor including the stopper member of WO2010/107075A1, the locking base is formed of a material having high strength in order to ensure the strength of a portion at which the male screw is formed in the locking base. Therefore, in order to attach the drive wheel to the locking base in the seat belt retractor of WO2010/107075A1, there is a problem in that the locking base increases in the axial direction of the winding drum, and the locking base becomes complicated in shape, making it difficult to manufacture the locking base.

SUMMARY OF INVENTION

Aspect of non-limiting embodiments of the present disclosure relates to provide a seat belt retractor that can easily manufacture a locking base, and that has configuration in which a stopper member is used and a pretensioner is disposed on the same side as the locking base.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a seat belt retractor including:
  a housing including a first side wall and a second side wall facing each other;
  a winding drum configured to wind up a webbing, the winding drum being housed between the first side wall and the second side wall so as to be rotatable in a winding direction and a pull-out direction of the webbing, the winding drum having a center hole opened on a first end surface of the winding drum, the first end surface of the winding drum located on a side of the first side wall;
  a locking base disposed to face the first end surface of the winding drum;
  a torsion bar inserted into the center hole of the winding drum, the torsion bar including one end side, which is opposite to the locking base, coupled to the winding drum without being rotatable relative to the winding drum, and the other end side coupled to the locking base without being rotatable relative to the locking base, the torsion bar being configured to be plastically deformed in a case where a pull-out force of the webbing exceeds a predetermined value in a state where the locking base is prevented from rotating in the pull-out direction, so as to absorb impact energy while allowing relative rotation between the winding drum and the locking base;
  a pretensioner including: a pretensioner casing attached to the first side wall; and a drive wheel attached to the locking base, the pretensioner being configured to rotate the winding drum in the winding direction via the drive wheel, the locking base, and the torsion bar, in an emergency of a vehicle;

a lock member located in the locking base, the lock member being configured to engage with the first side wall or the pretensioner casing to prevent the locking base from being rotated in the pull-out direction, in the emergency of the vehicle; and a stopper member being held in the center hole of the winding drum without being rotatable relative to the winding drum and so as to be movable in an axial direction of the winding drum, the stopper member being screwed onto a male screw of the locking base, the stopper member being configured to define an allowable amount of relative rotation between the winding drum and the locking base in a case where the torsion bar absorbs the impact energy, in which the locking base includes a first base member to which the drive wheel is attached, and a second base member, the second base member being attached to the first base member on a side of the first base member opposite to the winding drum without being rotatable relative to the first base member, the second base member being configured to hold the lock member between the first base member and the second base member, the first base member includes:
  a disk-shaped first main body portion in which the drive wheel is disposed between the first main body portion and the first end surface of the winding drum; and
  a protruding portion protruding, from the first main body portion, in a second direction of the axial direction of the winding drum so as to penetrate the drive wheel, the second direction being a direction toward the second side wall, the male screw is formed on an outer circumferential surface of a distal end side of the protruding portion, the first base member further includes:
  a first recess recessed from a distal end surface of the protruding portion, the first recess being configured to couple to the torsion bar; and
  a second recess recessed from a surface of the first main body portion on a side opposite to the drive wheel, the second recess being coaxial with the first recess, and the second base member includes:
  a plate-shaped second main body portion that overlaps the first main body portion; and
  a fitting protrusion that protrudes, in the second direction, from the second main body portion, the fitting protrusion fitting into the second recess.

BRIEF DESCRIPTION OF DRAWINGS

Exemplary embodiment(s) of the present invention will be described in detail based on the following figures, wherein:

FIG. 4 is a cross-sectional view taken along a line IV-IV in FIG. 3;

FIG. 5 is a cross-sectional view taken along a line V-V in FIG. 3;

FIG. 16B illustrates a state of the return spring in a case where the lock member is located at an engagement position.

DESCRIPTION OF EMBODIMENTS

Figure 1:
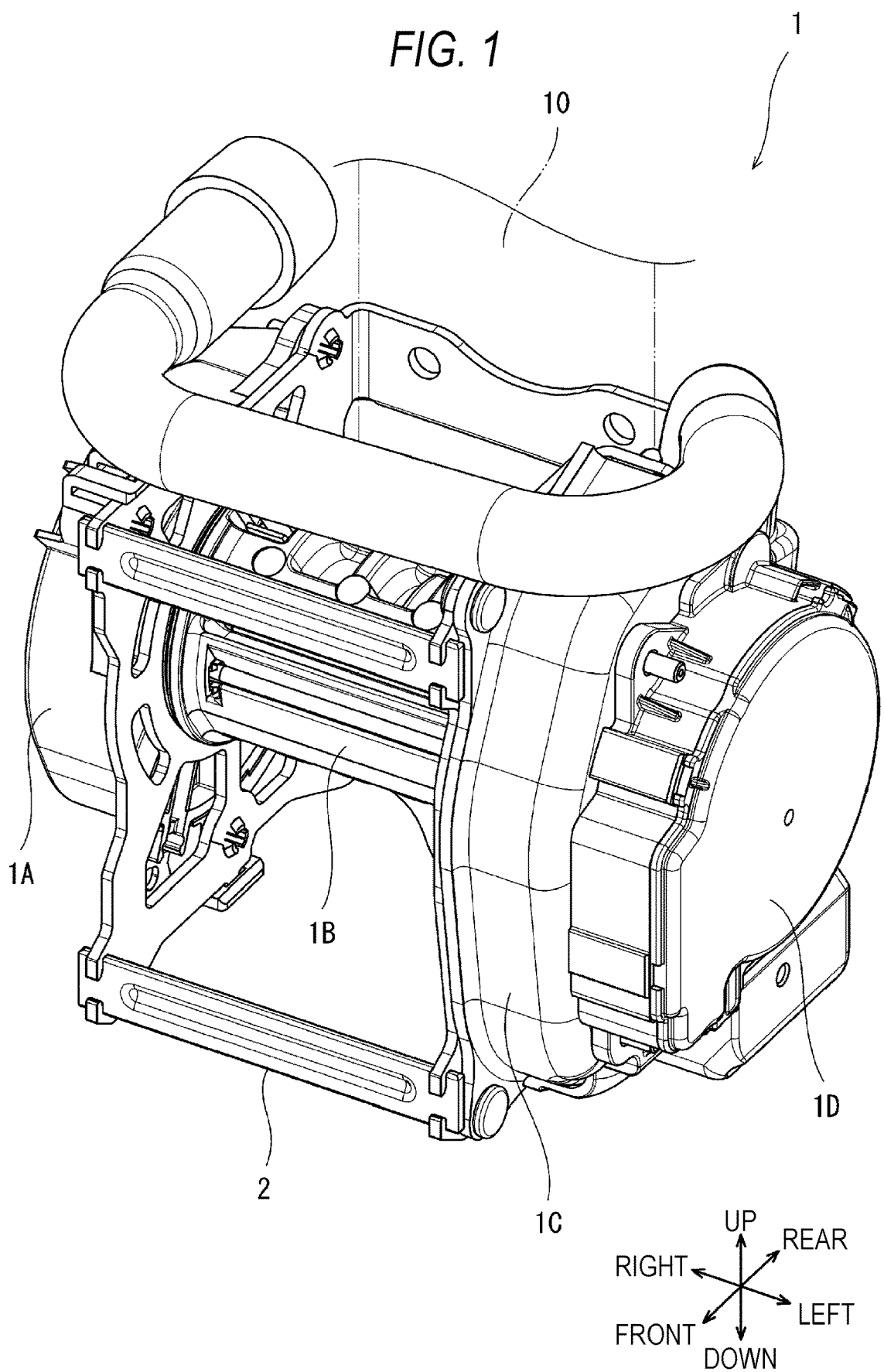
FIG. 1 is a perspective view of a seat belt retractor according to an embodiment of the present disclosure.
Figure 2:
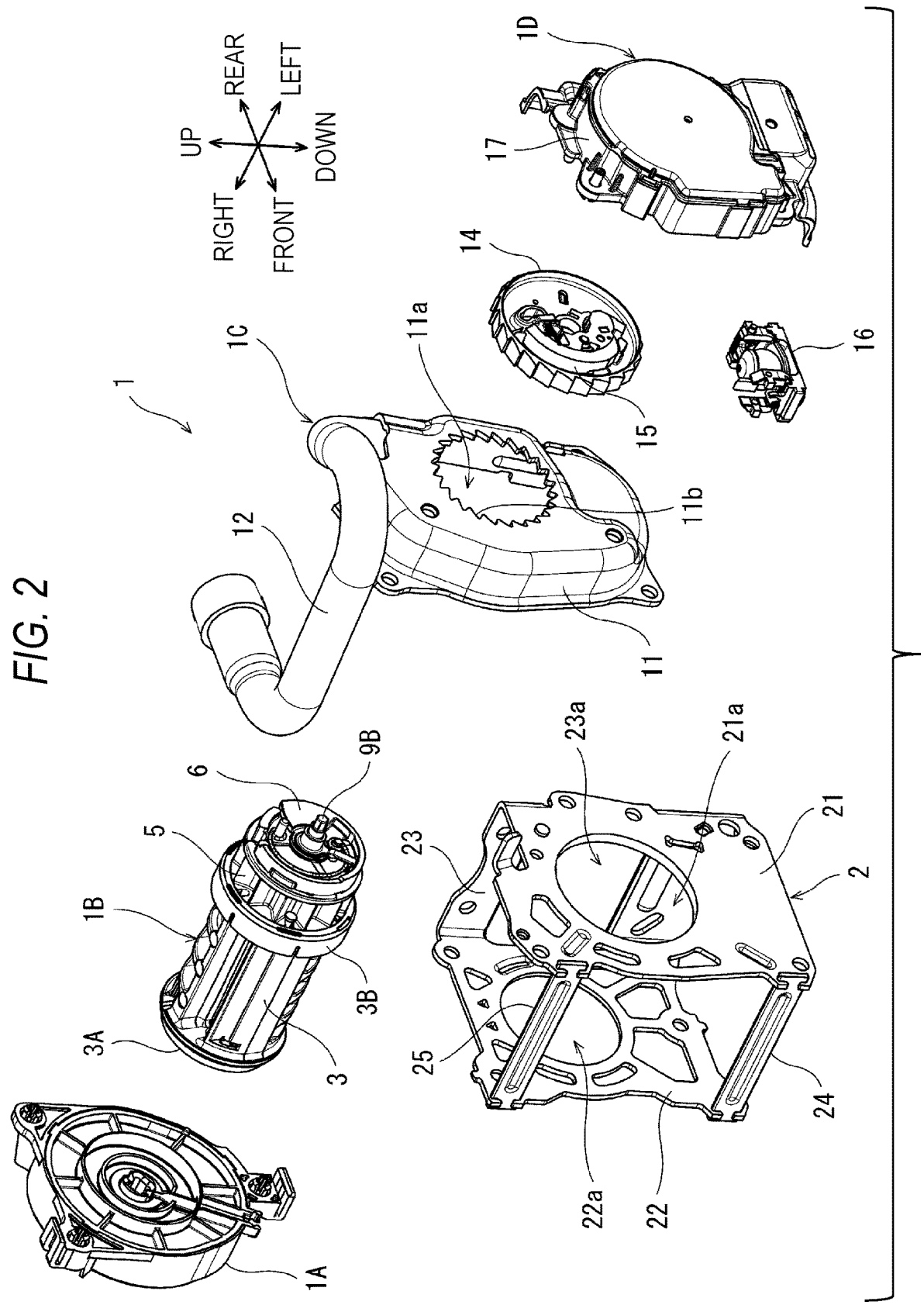
FIG. 2 is an exploded perspective view of the seat belt retractor illustrated in FIG. 1.

FIGS. 1 and 2 illustrate a seat belt retractor 1 according to an embodiment of the present disclosure. The seat belt retractor 1 is configured to prevent a webbing 10, which is a seat belt, from being pulled out, in an emergency such as vehicle collision.

Specifically, the seat belt retractor 1 includes a housing 2, a winding spring unit 1A, a winding drum unit 1B, a pretensioner 1C, and a lock unit 1D. The winding drum unit 1B includes a winding drum 3 configured to wind up the webbing 10. The housing 2 includes a first side wall 21 and a second side wall 22 that face each other in an axial direction of the winding drum 3.

The winding drum 3 is housed between the first side wall 21 and the second side wall 22 so as to be rotatable in a winding direction and a pull-out direction of the webbing 10. In the axial direction of the winding drum 3, a direction toward the first side wall 21 is a first direction, and a direction toward the second side wall 22, which is opposite to the first direction, is a second direction.

The housing 2 includes a back plate 23 that is formed by sheet metal processing together with the first side wall 21 and the second side wall 22, and that is perpendicular to the first side wall 21 and the second side wall 22. Hereinafter, for convenience of description, the axial direction of the winding drum 3 is referred to as a left-right direction (the first direction is referred to as a leftward direction, and the second direction is referred to as a rightward direction), and a thickness direction of the back plate 23 is referred to as a front-rear direction (a side of the side walls 21 and 22 is referred to as a forward direction, and an opposite side is referred to as a rearward direction). As illustrated in FIGS. 1 and 2, one side of a direction orthogonal to the left-right direction and the front-rear direction is referred to as an upward direction, and the other side of the direction orthogonal to the left-right direction and the front-rear direction is referred to as a downward direction.

Lower portions and upper portions of front sides of the first side wall 21 and the second side wall 22 of the housing 2 are connected by connecting bars 24 and 25. The first side wall 21 and the second side wall 22 are respectively provided with openings 21a and 22a through which the winding drum 3 is inserted. The back plate 23 is provided with an opening 23a through which the winding drum 3 is exposed.

The winding spring unit 1A is attached to the second side wall 22. The pretensioner 1C is attached to the first side wall 21 of the housing 2. The lock unit 1D is attached to the pretensioner 1C.

Figure 3:
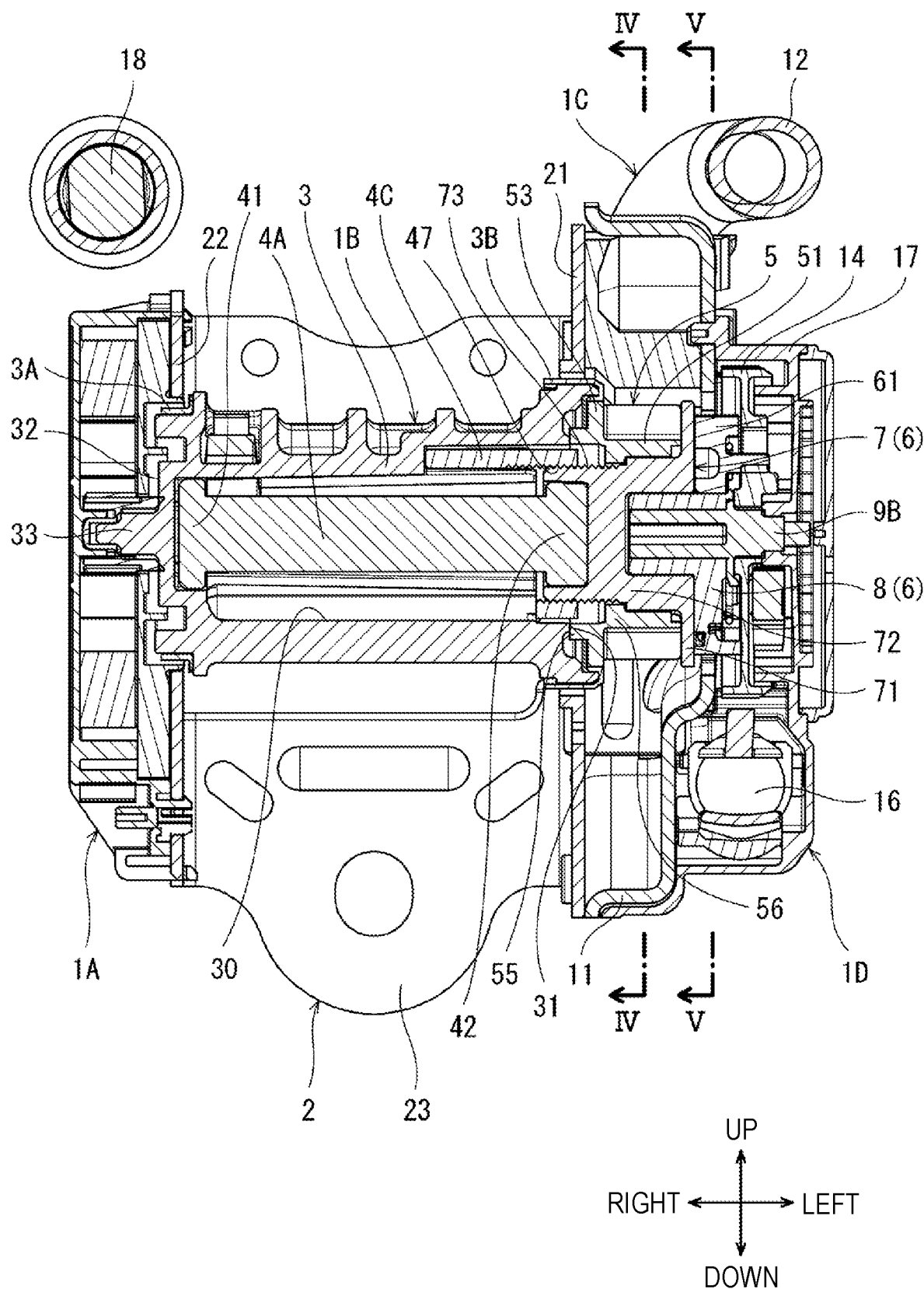
FIG. 3 is a cross-sectional view of the seat belt retractor illustrated in FIG. 1.

As illustrated in FIG. 3, the winding drum 3 includes a first end surface 31 on a side of the first side wall 21 of the housing 2, and a second end surface 32 on a side of the second side wall 22 of the housing 2. In the present embodiment, the winding drum 3 includes a shaft portion 33 protruding from the second end surface 32 in the rightward direction, and the shaft portion 33 is rotatably supported by the winding spring unit 1A. However, a torsion bar 4A to be described later may penetrate the winding drum 3, and a right end portion of the torsion bar 4A may be rotatably supported by the winding spring unit 1A. Since a configuration of the winding spring unit 1A is known, a detailed description thereof will be omitted.

Figure 6:
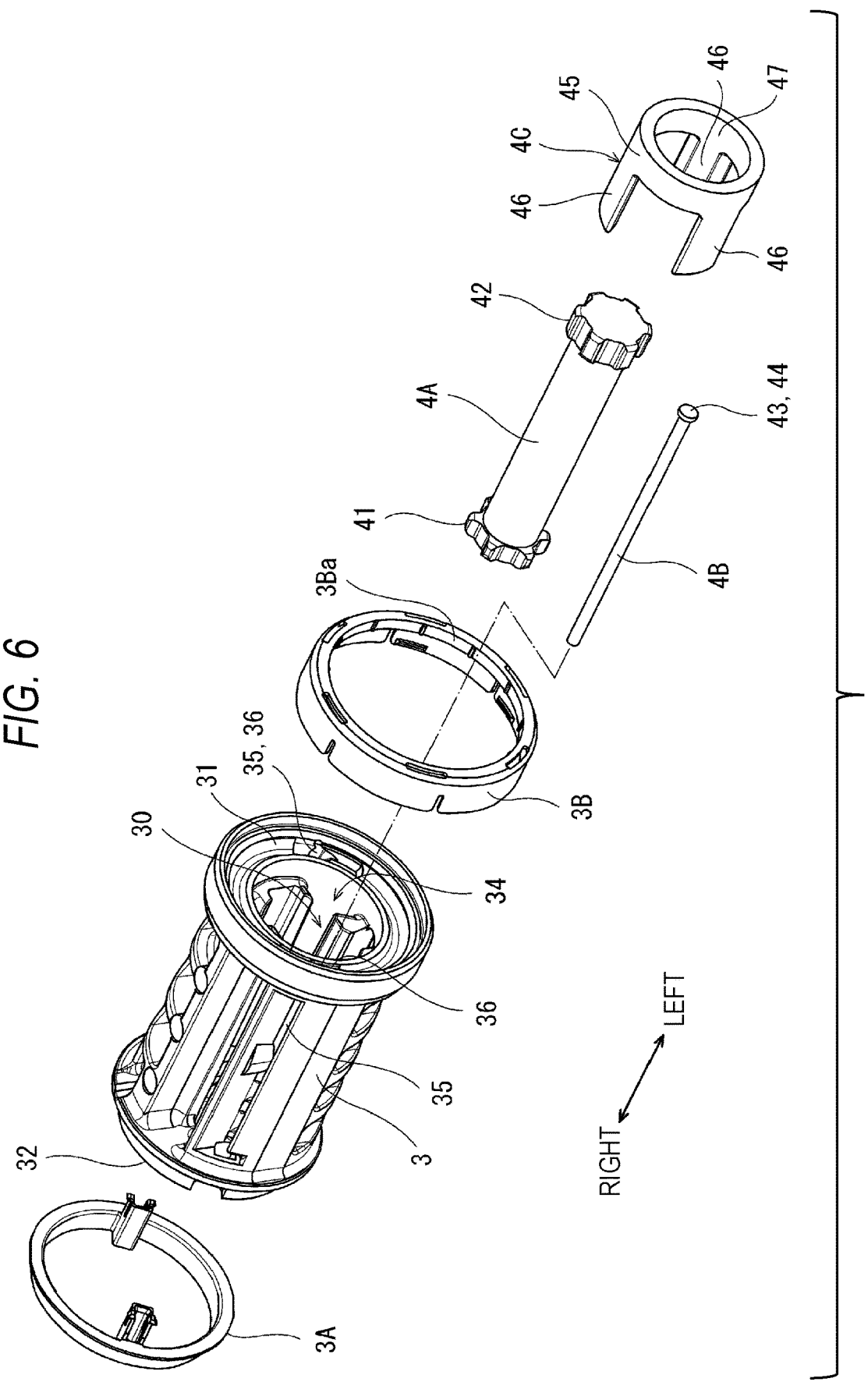
FIG. 6 is an exploded perspective view of a part of a winding drum unit.
Figure 7:
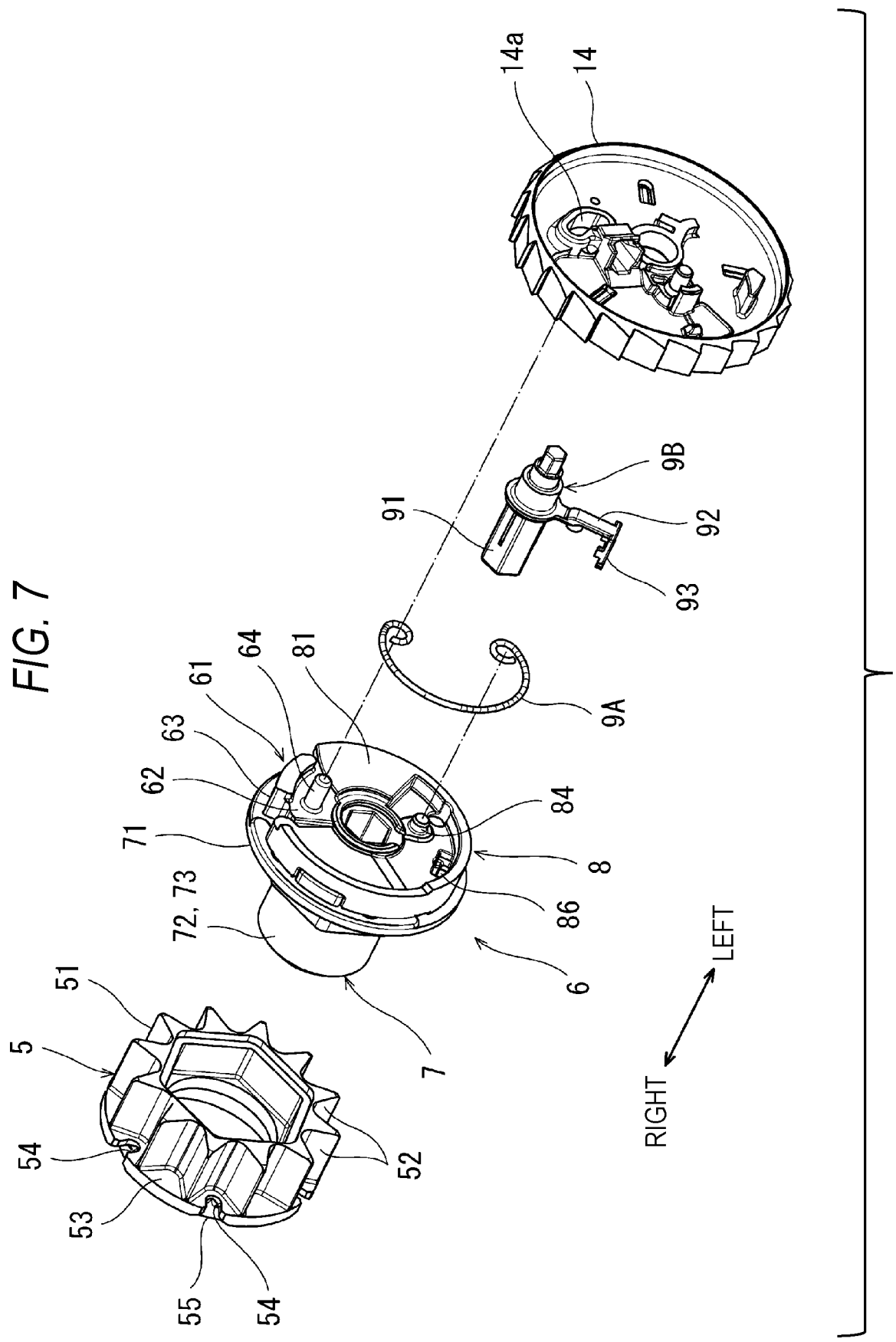
FIG. 7 is an exploded perspective view of the rest of the winding drum unit and a synchronized gear.

As illustrated in FIGS. 6 and 7, the winding drum unit 1B includes a bush 3A, a bearing 3B, the torsion bar 4A, an impact energy absorbing wire 4B, a stopper member 4C, a drive wheel 5, a locking base 6, a return spring 9A, and a rotation shaft 9B, in addition to the winding drum 3. The drive wheel 5 is also a component of the pretensioner 1C. In other words, the drive wheel 5 is included in the pretensioner 1C.

The bush 3A and the bearing 3B are emergency means for smoothly rotating the winding drum 3 even when a relative position of the winding drum 3 with respect to the housing 2 is shifted in an emergency of a vehicle. As illustrated in FIG. 3, the bush 3A is attached to a right end portion of the winding drum 3, which is positioned inside the opening 22a of the second side wall 22, and the bearing 3B is attached to a left end portion of the winding drum 3, which is positioned in the opening 21a of the first side wall 21. Further, the bearing 3B includes a folded portion 3Ba (see FIG. 6) that is folded back to an inner side of the left end portion of the winding drum 3. The folded portion 3Ba is configured to slide with the drive wheel 5, which is attached to the locking base 6 without being rotatable, in a case where the winding drum 3 and the locking base 6 rotate relative to each other.

The winding drum 3 has a center hole 30 extending along a center axis of the winding drum 3. In the present embodiment, the center hole 30 is bottomed and is opened only in the first end surface 31. However, in a case where the torsion bar 4A penetrates the winding drum 3 as described above, the center hole 30 may be opened not only in the first end surface 31 but also in the second end surface 32.

The torsion bar 4A is inserted into the center hole 30 of the winding drum 3. The locking base 6 is disposed to face the first end surface 31 of the winding drum 3. The torsion bar 4A includes one end side, opposite to the locking base 6, coupled to the winding drum 3 without being rotatable relative to the winding drum 3, and the other end side coupled to the locking base 6 without being rotatable relative to the locking base 6.

More specifically, the torsion bar 4A includes spline-shaped coupling portions 41 and 42, on the one end side and the other end side, respectively. The bottom of the center hole 30 of the winding drum 3 includes a spline-shaped recess for coupling with the coupling portion 41, and the coupling portion 41 is fitted into the recess.

The torsion bar 4A is configured to be plastically deformed in a case where a pull-out force of the webbing 10 exceeds a predetermined value in a state where the locking base 6 is prevented from being rotated in the pull-out direction, so as to absorb impact energy while allowing the relative rotation between the winding drum 3 and the locking base 6.

Figure 8:
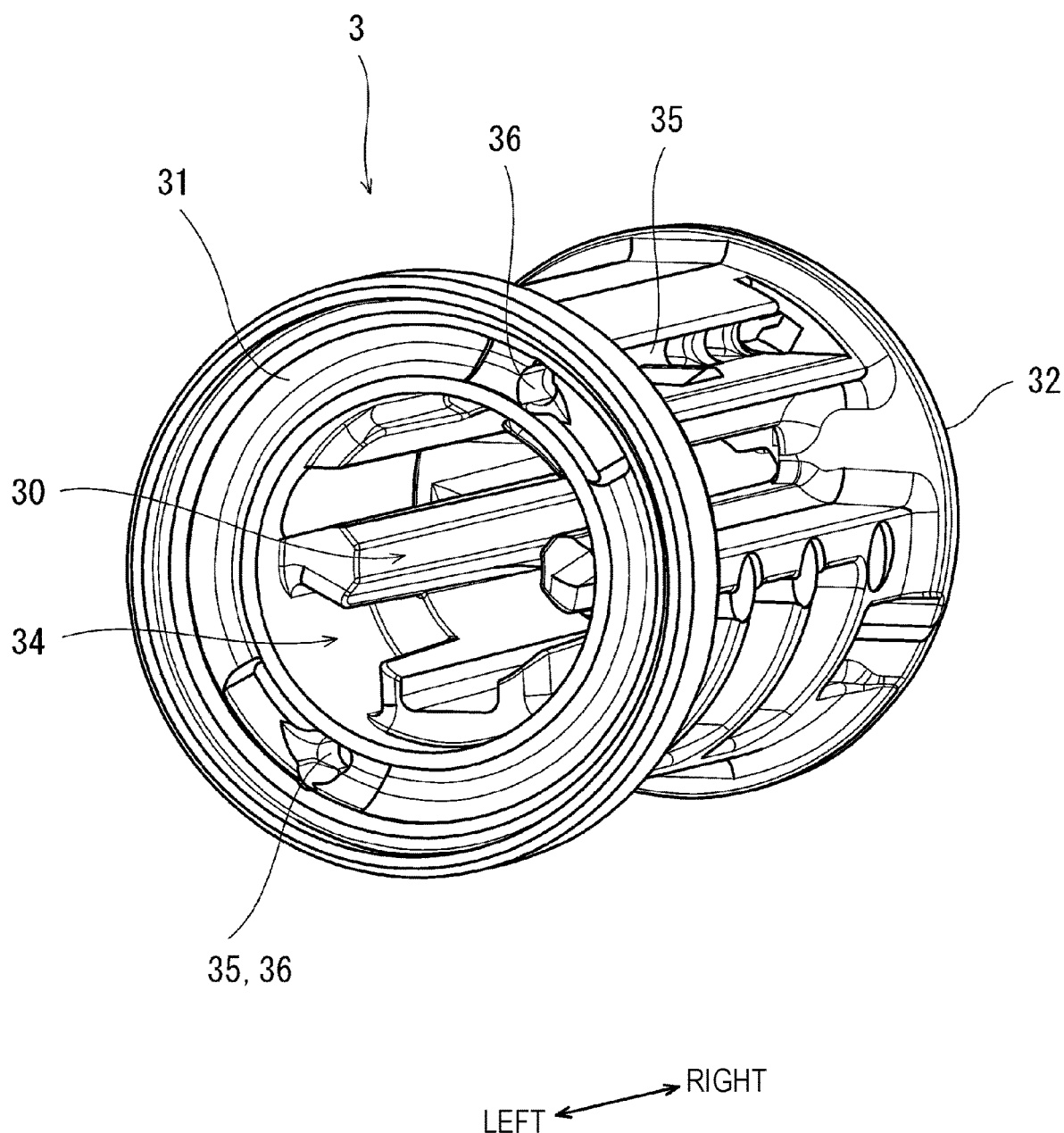
FIG. 8 is a perspective view of a winding drum.

The impact energy absorbing wire 4B is configured to absorb impact energy at an initial stage when the winding drum 3 and the locking base 6 rotate relative to each other. In the present embodiment, as illustrated in FIG. 8, the winding drum 3 includes two slots 35 that are opened in the first end surface 31. In the present embodiment, although each slot 35 has a groove shape recessed obliquely from an outer circumferential surface of the winding drum 3, the slot 35 may be a hole extending in the axial direction of the winding drum 3.

The impact energy absorbing wire 4B is housed in one of the slots 35 in a state where a head portion 43 (see FIG. 6) protrudes from an opening 36 of the slot 35. The impact energy absorbing wire 4B is configured to be pulled out from the opening 36 while being plastically deformed in a case where the winding drum 3 and the locking base 6 are relatively rotated, so as to absorb the impact energy. Incidentally, the impact energy absorbing wire 4B may be omitted.

The stopper member 4C defines an allowable amount of the relative rotation between the winding drum 3 and the locking base 6 in a case where the torsion bar 4A absorbs the impact energy. The stopper member 4C is held in the center hole 30 of the winding drum 3 without being rotatable relative to the winding drum 3 and so as to be movable in the left-right direction.

As illustrated in FIG. 6, the stopper member 4C has a tubular shape through which the torsion bar 4A is inserted. The stopper member 4C is formed with a female screw 47 on an inner circumferential surface of the stopper member 4C.

In the present embodiment, the stopper member 4C includes an annular portion 45 and three claw portions 46 that protrude from the annular portion 45 in the rightward direction. On the other hand, the center hole 30 of the winding drum 3 includes three guide grooves 34. Since respective three claw portions 46 are fitted into the three guide grooves 34, the stopper member 4C is held by the winding drum 3 without being rotatable relative to the winding drum 3 and so as to be movable in the left-right direction. However, instead of the stopper member 4C including the claw portions 46, a cross-sectional shape of an outer shape of the stopper member 4C and a cross-sectional shape of a left end portion of the center hole 30 of the winding drum 3 may be polygonal.

As illustrated in FIGS. 3 and 7, the locking base 6 is formed with a male screw 73 onto which the female screw 47 of the stopper member 4C is screwed. The annular drive wheel 5 is attached to the locking base 6. In the present embodiment, as illustrated in FIG. 3, during the relative rotation between the winding drum 3 and the locking base 6, the stopper member 4C moves from a position at which the stopper member 4C is separated from the drive wheel 5 to a position at which the stopper member 4C comes into contact with the drive wheel 5, whereby the relative rotation between the winding drum 3 and the locking base 6 is restricted to a predetermined amount. Accordingly, the stopper member 4C comes into contact with the drive wheel 5, the stopper member 4C is easily prevented from being moved in the axial direction of the winding drum 3, and the relative rotation between the winding drum 3 and the locking base 6 is able to be restricted to a predetermined amount.

Figure 9:
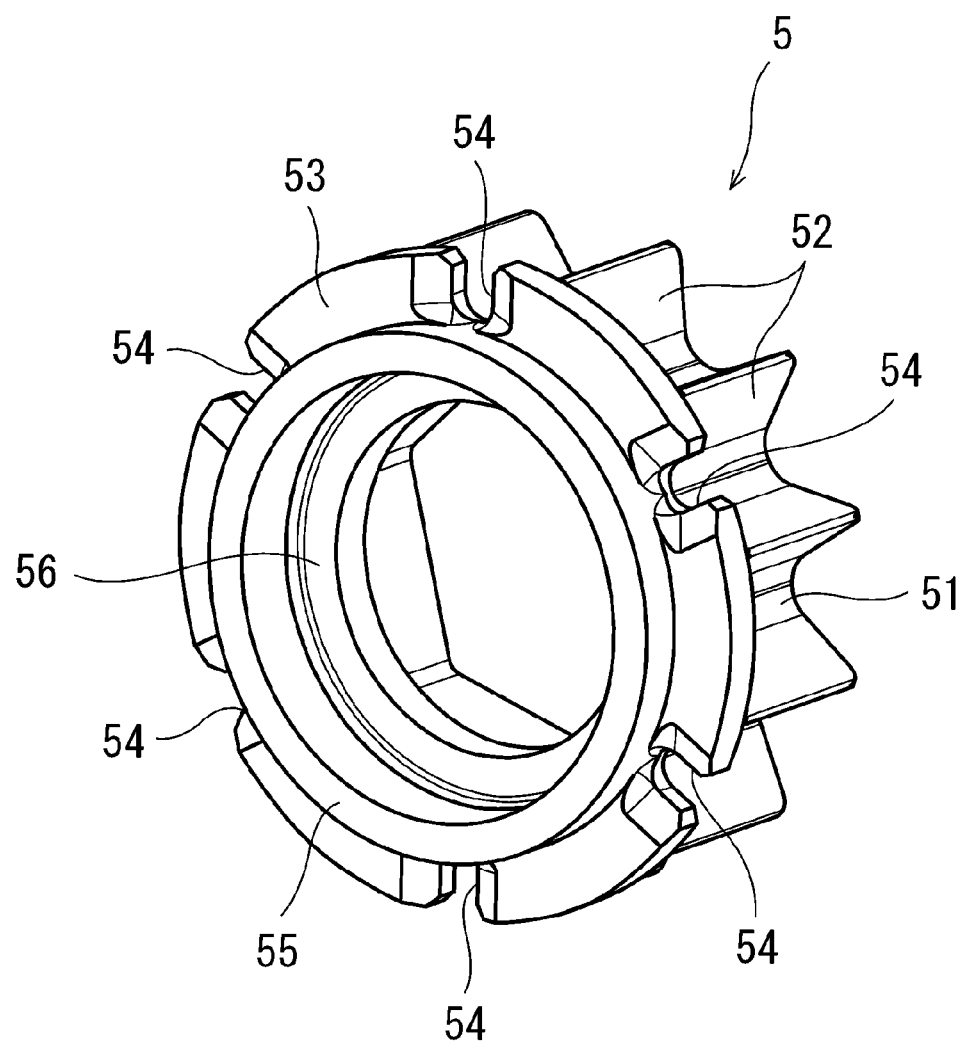
FIG. 9 is a perspective view of a drive wheel.
Figure 10:
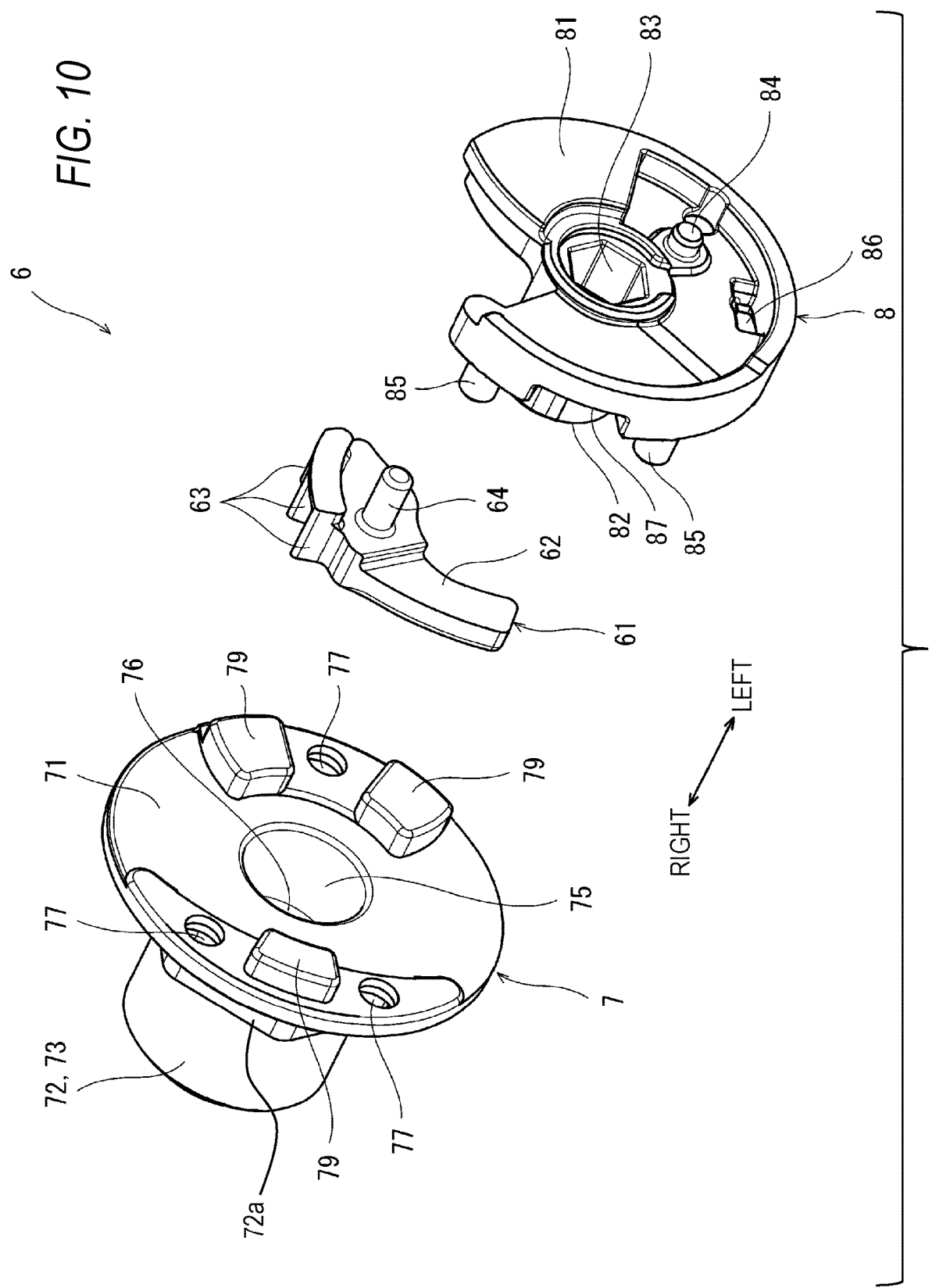
FIG. 10 is an exploded perspective view of a locking base and a lock member.
Figure 11:
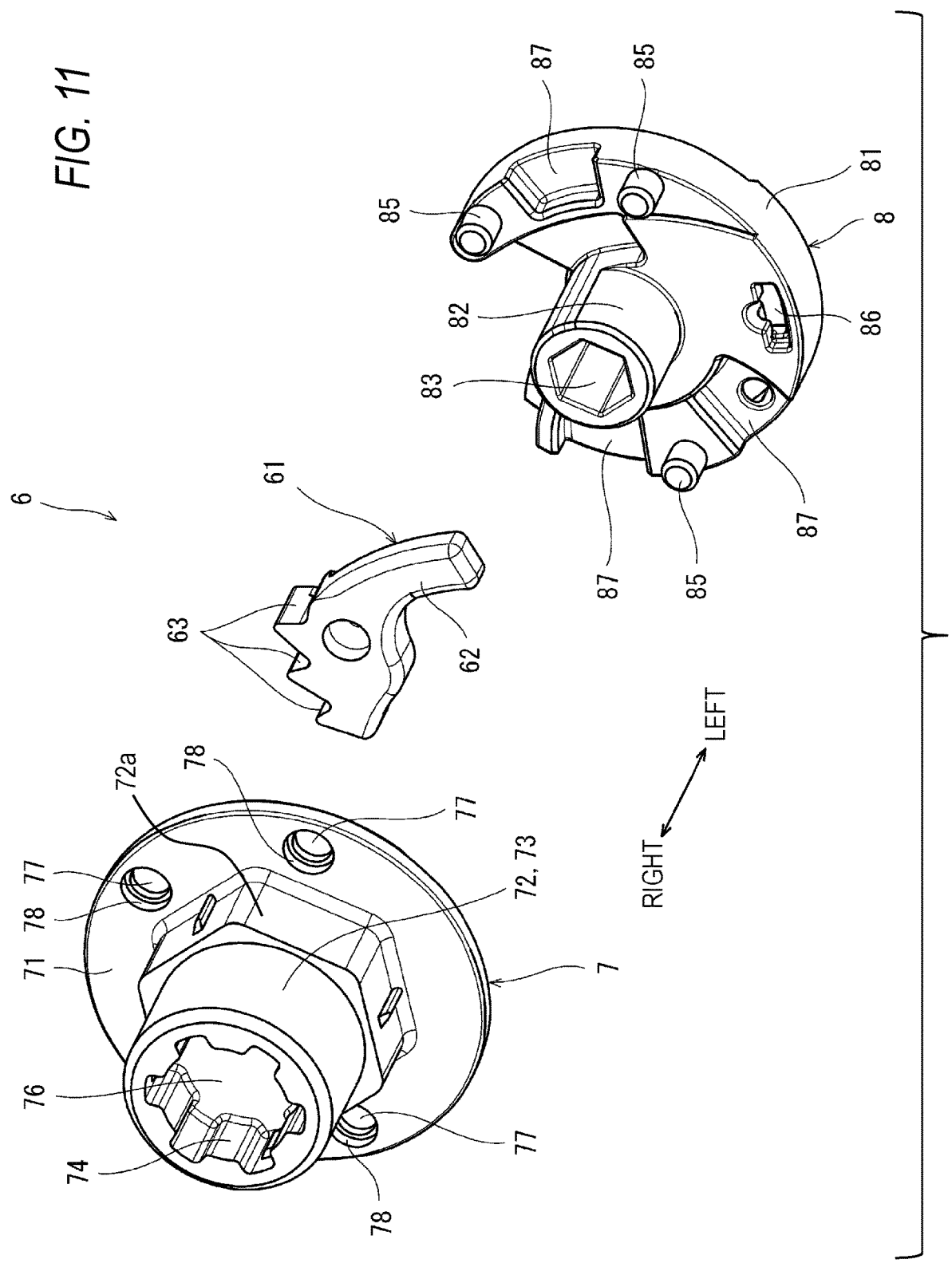
FIG. 11 is an exploded perspective view of the locking base and the lock member as viewed from an opposite side.
Figure 12:
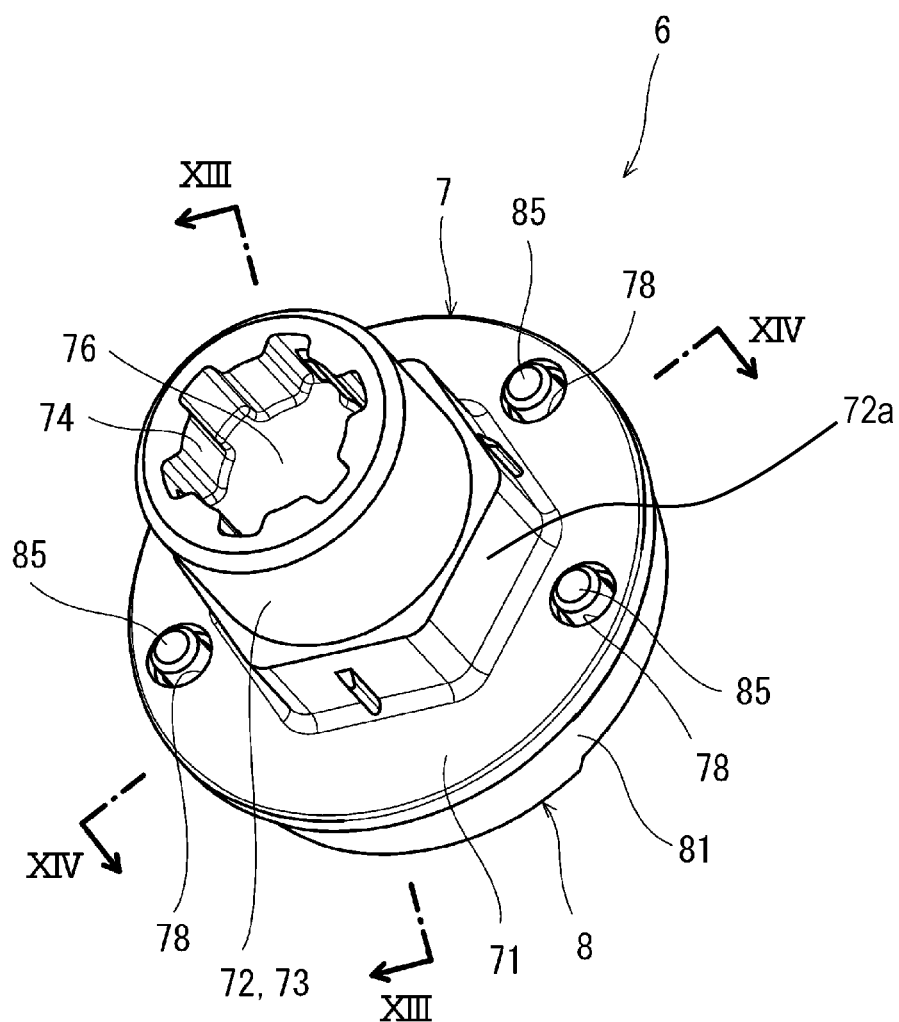
FIG. 12 is a perspective view of the locking base.

As illustrated in FIGS. 7 and 9, the drive wheel 5 includes a main body portion 51 having a fitting hole with a hexagonal cross-sectional shape, a plurality of teeth 52 formed on an outer circumferential surface of the main body portion 51, an annular flange 53 that protrudes outward in a radial direction from the main body portion 51 on a right side of the teeth 52, and a ring-shaped rib 55 that protrudes from the flange 53 in the rightward direction.

The flange 53 includes a plurality of (six in the illustrated example) holding grooves 54. The head portion 43 of the impact energy absorbing wire 4B is attached to one of the holding grooves 54. The head portion 43 of the impact energy absorbing wire 4B includes a coming-off prevention portion 44 (see FIG. 6) having a larger width than the holding groove 54.

As illustrated in FIG. 3, in the present embodiment, the drive wheel 5 comes into contact with the first end surface 31 of the winding drum 3 via the rib 55. The impact energy absorbing wire 4B is pulled out from the opening 36 of the slot 35 while being wound around the rib 55. In a case where the winding drum 3 and the locking base 6 rotate relative to each other, the drive wheel 5, attached to the locking base 6 without being rotatable relative to each other, is rotated relative to the winding drum 3 while the rib 55 of the drive wheel 5 comes into contact with the first end surface 31 of the winding drum 3 in the axial direction of the winding drum 3, and while an outer circumference of the flange 53 of the drive wheel 5 comes into contact with the folded portion 3Ba of the bearing 3B attached to the winding drum 3 in a radial direction of the winding drum 3.

Further, an annular flange 56 protrudes from an inner circumferential surface of the main body portion 51. The flange 56 is a portion that comes into contact with the stopper member 4C. In this way, it is possible to secure a large contact area between the flange 56 and the stopper member 4C by bringing the stopper member 4C into contact with the flange 56 of the drive wheel 5 instead of a stepped portion (proximal end portion 72a described later) of the locking base 6.

The pretensioner 1C rotates the winding drum 3 in the winding direction, via the drive wheel 5, the locking base 6, and the torsion bar 4A, in the emergency of the vehicle. As illustrated in FIGS. 2 to 4, the pretensioner 1C includes a pretensioner casing 11 attached to the first side wall 21 of the housing 2, a pipe 12 extending from the pretensioner casing 11 while being bent, a moving member 13 disposed in the pipe 12, and a gas generator 18 disposed in a distal portion of the pipe 12.

In the present embodiment, the moving member 13 has a rod shape and is configured to be plastically deformed by the digging of the teeth 52 of the drive wheel 5. However, the moving member 13 may be implemented by a plurality of divided bodies (for example, spheres) arranged at the same pitch as the teeth 52 of the drive wheel 5. In the emergency of the vehicle, the moving member 13 is engaged with the teeth 52 of the drive wheel 5 while being pushed out from the pipe 12 by gas generated in the gas generator 18, and the moving member 13 rotates the drive wheel 5 in the winding direction. As the drive wheel 5 rotates, the locking base 6, the torsion bar 4A, and the winding drum 3 also rotate. After the pretensioner 1C is activated, the moving member 13 is prevented from being pushed back into the pipe 12 by a pressure of the gas in the pipe 12, and thus the drive wheel 5 is prevented from being rotated in the pull-out direction.

As illustrated in FIGS. 2 and 5, the pretensioner casing 11 is provided with an opening 11a through which the locking base 6 is inserted, and the opening 11a has internal teeth 11b formed on a circumferential edge of the opening 11a. On the other hand, the locking base 6 includes a lock member 61 configured to be engageable with the internal teeth 11b. The lock member 61 is engaged with the internal teeth 11b to prevent the locking base 6 from being rotated in the pull-out direction, in the emergency of the vehicle.

As illustrated in FIGS. 10 to 14, the locking base 6 includes a first base member 7 to which the drive wheel 5 is attached, and a second base member 8 that is attached to the first base member 7 on a side of the first base member 7 opposite to the winding drum 3 without being rotatable relative to the first base member 7. The lock member 61 is held between the first base member 7 and the second base member 8.

More specifically, the first base member 7 includes a disk-shaped first main body portion 71 and a protruding portion 72 that protrudes from the first main body portion 71 in the rightward direction. As illustrated in FIG. 3, the drive wheel 5 is disposed between the first main body portion 71 and the first end surface 31 of the winding drum 3, and the protruding portion 72 penetrates the drive wheel 5. The male screw 73 is formed on an outer circumferential surface of a distal end side of the protruding portion 72. The protruding portion 72 includes, at a proximal side of the male screw 73, a proximal end portion 72a protruding radially outward more than the male screw 73. The proximal end portion 72a of the protruding portion 72 is formed to have a hexagonal cross-sectional shape. The fitting hole of the main body portion 51 of the drive wheel 5 is also formed to have the hexagonal cross section, and by fitting the proximal end portion 72a into the fitting hole, the drive wheel 5 is attached to the first base member 7 without being rotatable relative to the first base member 7. However, the proximal end portion 72a of the protruding portion 72 may be formed to have a non-circular cross-sectional shape such as polygonal except for hexagonal. The fitting hole of the main body portion 51 of the drive wheel 5 is also formed to have the non-circular cross-sectional shape, and by fitting the proximal end portion 72a into the fitting hole, the drive wheel 5 is attached to the first base member 7 without being rotatable relative to the first base member 7.

The first base member 7 includes a first recess 74 that is recessed from a distal end surface of the protruding portion 72, and a second recess 75 that is coaxial with the first recess 74 and is recessed from a surface of the first main body portion 71 on a side opposite to the drive wheel 5. The first recess 74 is a spline-shaped recess for coupling with the coupling portion 42 of the torsion bar 4A, and the coupling portion 42 is fitted into the first recess 74. In the present embodiment, the second recess 75 has a circular cross-sectional shape.

In the present embodiment, the first base member 7 includes a partition 76 that separates the first recess 74 and the second recess 75. That is, the first recess 74 and the second recess 75 are bottomed. Therefore, it is possible to avoid a shape of the first base member 7 having a deep recess or a thick portion. Accordingly, the first base member 7 can be formed by, for example, forging.

Figure 13:
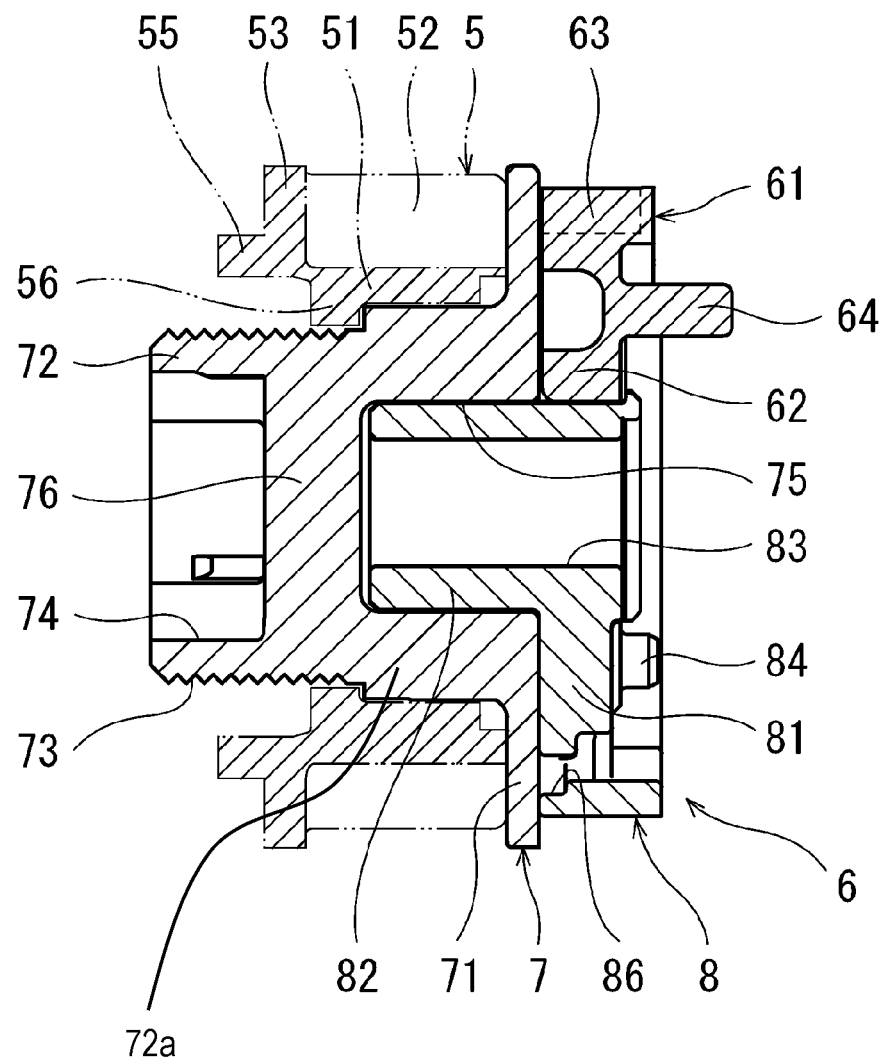
FIG. 13 is a cross-sectional view taken along a line XIII-XIII in FIG. 12.

As illustrated in FIG. 13, the second recess 75 has a depth overlapping the drive wheel 5 in the left-right direction, and there is a space between a distal end of a fitting protrusion 82 (to be described later) of the second base member 8 and the partition 76 of the first base member 7. For example, the space between the distal end of the fitting protrusion 82 of the second base member 8 and the partition 76 of the first base member 7 is 0.5 mm to 5.0 mm.

The second base member 8 includes a plate-shaped second main body portion 81 that overlaps the first main body portion 71, and the fitting protrusion 82 that protrudes from the second main body portion 81 in the rightward direction. In the present embodiment, the second main body portion 81 includes three engagement concave portions 87, and by engaging respective three engagement convex portions 79 provided on the first main body portion 71 with the engagement concave portions 87, the second base member 8 is attached to the first base member 7 without being rotatable relative to the first base member 7. The fitting protrusion 82 has a circular cross-sectional shape, and the fitting protrusion 82 is fitted into the second recess 75. However, the second recess 75 and the fitting protrusion 82 may have a non-circular cross sectional shape, and by fitting the fitting protrusion 82 into the second recess 75, the second base member 8 may be attached to the first base member 7 without being rotatable relative to the first base member 7. In this case, the engagement concave portions 87 and the engagement convex portions 79 may be omitted.

Figure 15:
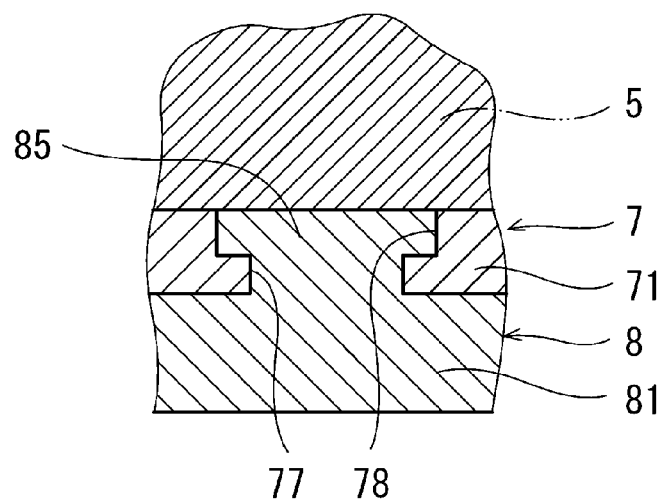
FIG. 15 is a cross-sectional view taken along a line XV-XV in FIG. 14.

In the present embodiment, the second main body portion 81 of the second base member 8 includes three crimping protrusions 85 protruding in the rightward direction, whereas the first main body portion 71 of the first base member 7 is provided with three through holes 77 through which the crimping protrusions 85 are inserted. As illustrated in FIG. 15, a crimping concave portion 78 that is coaxial with the through hole 77 and has a larger diameter than the through hole 77 is formed on a side of the first main body portion 71 opposite to the second main body portion 81. A portion of each crimping protrusion 85, which protrudes from the through hole 77, is crimped to have a larger diameter than the through hole 77 in the crimping concave portion 78 and to have an outer diameter substantially equal to an inner diameter of the crimping concave portion 78 (in FIGS. 10 to 12, the crimping protrusion 85 is drawn in a shape before crimping). In addition, after the crimping, the crimping protrusion 85 does not protrude to a drive wheel 5 side from the crimping concave portion 78. The number of crimping protrusions 85 and the number of through holes 77 are not necessarily three, and may be one, two, or four or more.

Figure 14:
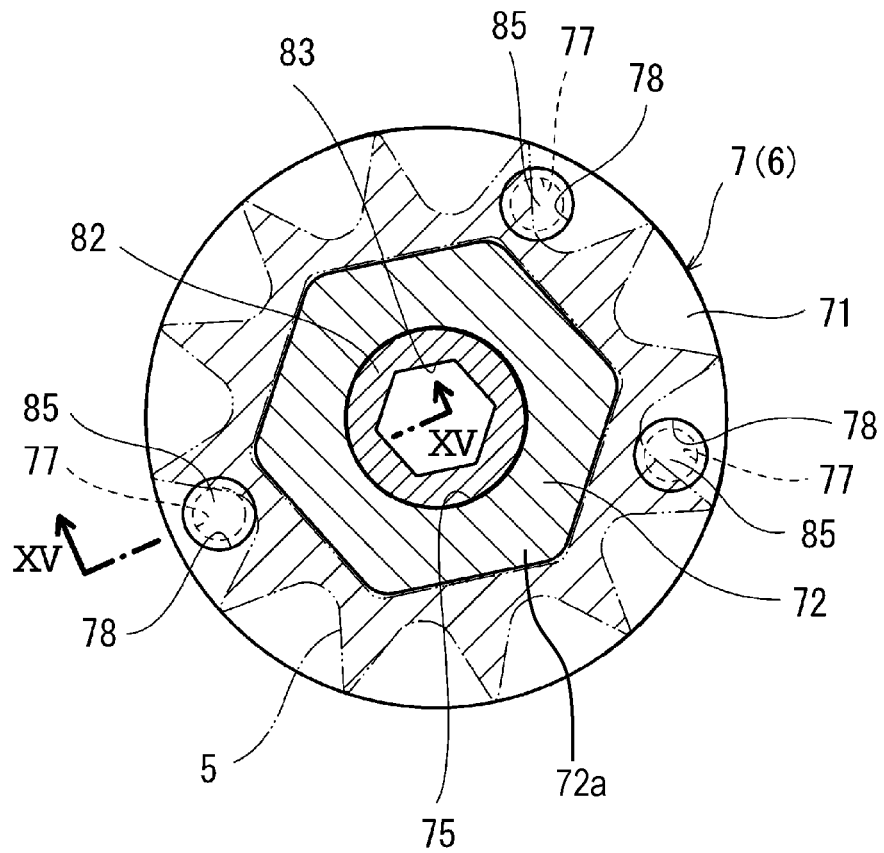
FIG. 14 is a cross-sectional view taken along a line XIV-XIV in FIG. 12.

In the present embodiment, as illustrated in FIG. 14, in a case where the drive wheel 5 is attached to the locking base 6, the crimping protrusion 85 after the crimping is partially hidden by the tooth 52 of the drive wheel 5.

The first base member 7 is formed of a material having a higher strength than the second base member 8. For example, the first base member 7 is formed of carbon steel, and the second base member 8 is formed of aluminum alloy or zinc alloy. In a case in which the second base member 8 has no crimping protrusion 85, the second base member 8 may be formed of resin, and may be provided with claws that are engaged with the crimping concave portions by utilizing elastic deformation of resin instead of the crimping protrusions 85. When the second base member 8 is formed of aluminum alloy or zinc alloy having a low specific gravity or formed of resin, the second base member 8 can be reduced in weight.

The lock member 61 includes a substantially arc-shaped and plate-shaped main body portion 62 that is held by the first main body portion 71 of the first base member 7 and the second main body portion 81 of the second base member 8, a plurality of (three in the illustrated example) engaging teeth 63 formed on an outer side surface of the main body portion 62 and configured to be engageable with the internal teeth 11b, and an operation shaft 64 that protrudes from the main body portion 62 in the leftward direction.

The second main body portion 81 of the second base member 8 includes a pin 84 that protrudes in the leftward direction. The return spring 9A has a substantially arc shape as illustrated in FIG. 7. The return spring 9A includes one end engaged with the operation shaft 64 of the lock member 61 and the other end engaged with the pin 84. The return spring 9A is configured to maintain the lock member 61 at a non-engagement position illustrated in FIG. 16A.

As illustrated in FIG. 13, the second base member 8 is provided with an engagement hole 83 that is coaxial with the fitting protrusion 82 and is opened in the leftward direction. In the present embodiment, the engagement hole 83 penetrates the second base member 8 and is also opened in the rightward direction. The engagement hole 83 has a hexagonal cross-sectional shape.

The lock member 61 is operated by a synchronized gear 14 (see FIGS. 2 and 7). As illustrated in FIG. 2, the lock unit 1D includes a cover member 17 that houses the synchronized gear 14 and a vehicle sensor 16. The synchronized gear 14 includes a webbing sensor 15. The webbing sensor 15 is configured to be activated in a case where the webbing 10 is rapidly pulled out, whereby the synchronized gear 14 is prevented from being rotated in the pull-out direction. The vehicle sensor 16 is configured to be activated in a case where an acceleration of the vehicle changes largely, whereby the synchronized gear 14 is prevented from being rotated in the pull-out direction.

Figure 16A:
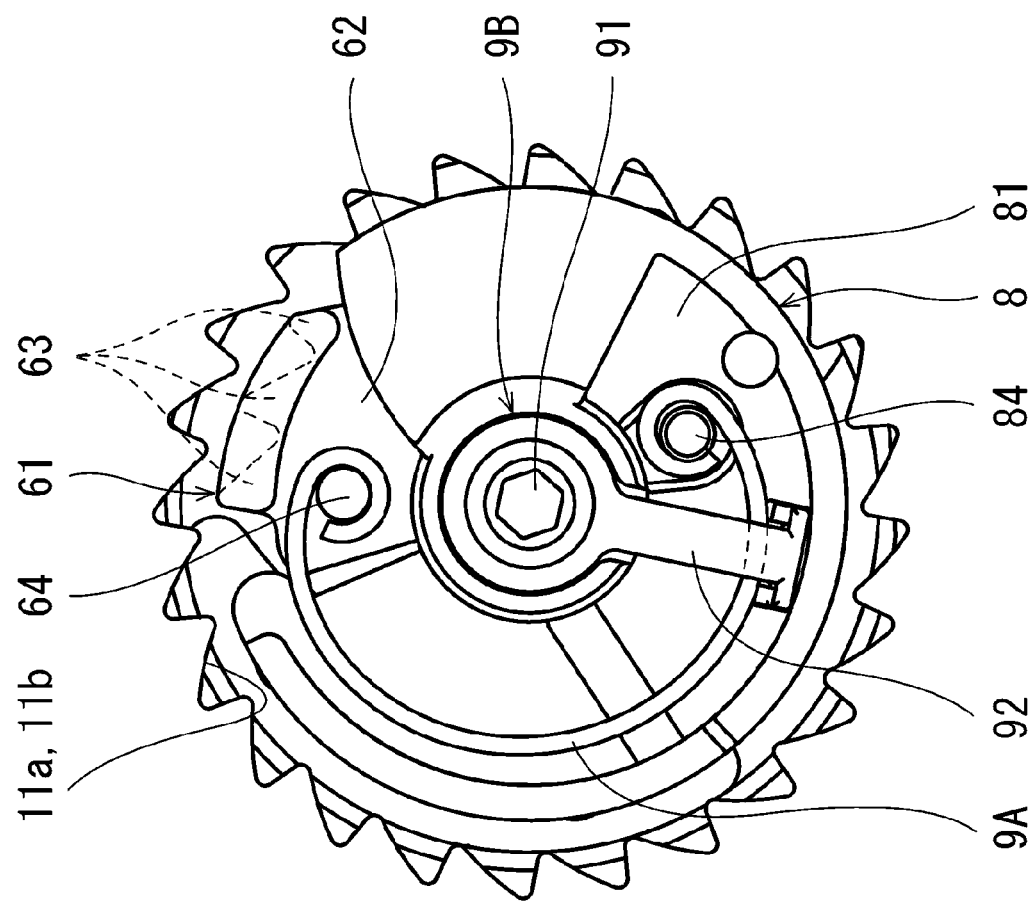
FIG. 16A illustrates a state of a return spring in a case where the lock member is located at a non-engagement position.

In a case where the synchronized gear 14 is prevented from being rotated in the pull-out direction, the locking base 6 is rotated relative to the synchronized gear 14 together with the winding drum 3, and the operation shaft 64 of the lock member 61 is operated in a guide hole 14a (see FIG. 7) of the synchronized gear 14, whereby the lock member 61 moves from the non-engagement position illustrated in FIG. 16A to an engagement position illustrated in FIG. 16B.

As illustrated in FIG. 7, the rotation shaft 9B includes a rod-shaped main body portion 91, and an arm 92 extending outward from the main body portion 91 in the radial direction. A right side portion of the main body portion 91 has a hexagonal cross-sectional shape, and the right side portion is fitted into and engaged with the engagement hole 83 of the second base member 8. The arm 92 is for restraining the return spring 9A, and a hook 93 provided at a distal end of the arm 92 is engaged with an engagement hole 86 provided in the second main body portion 81 of the second base member 8.

In the present embodiment, the rotation shaft 9B is formed of resin. As illustrated in FIG. 3, a left side portion of the rotation shaft 9B penetrates the synchronized gear 14 and is rotatably supported by the cover member 17 of the lock unit 1D.

As described above, in the seat belt retractor 1 according to the present embodiment, the locking base 6 is divided into the first base member 7 on which the male screw 73 is formed and the second base member 8, and thus shapes of the first base member 7 and the second base member 8 can be simplified. Therefore, the locking base 6 can be easily manufactured.

In the present embodiment, a cavity is formed in the locking base 6 by the space between the distal end of the fitting protrusion 82 of the second base member 8 and the partition 76 of the first base member 7, and thus volumes of the first base member 7 and the second base member 8 can be reduced. Accordingly, the locking base 6 can be reduced in weight.

In the present embodiment, the rotation shaft 9B is formed of resin, and thus the seat belt retractor 1 can be reduced in weight as compared with a case where the rotation shaft 9B is formed of metal.

In the present embodiment, the crimping protrusion 85 of the second base member 8, which is inserted into the through hole 77 of the first base member 7 of the locking base 6, is crimped, and thus the relative movement between the first base member 7 and the second base member 8 in the left-right direction (the axial direction of the winding drum 3) can be easily prevented. In addition, the first base member 7 and the second base member 8 are integrated with each other after the crimping, and thus the assembly is also easy.

Modification

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

For example, the pretensioner 1C is disposed outside the housing 2 in the above embodiment, however the pretensioner 1C may be disposed inside the housing 2. In this case, the opening 21a of the first side wall 21 of the housing 2 includes the internal teeth 11b formed on a circumferential edge of the opening 21a, and the lock member 61 may be engaged with the internal teeth 11b in an emergency of a vehicle.

A clutch may be provided between the drive wheel 5 and the locking base 6 such that the drive wheel 5 is rotated together with the locking base 6 in the winding direction of the webbing only in the emergency. In a case where the clutch is provided, for example, when the drive wheel 5 is rotated in the winding direction by the moving member 13 and is rotated relative to the locking base 6 by a predetermined angle, the drive wheel 5 and the locking base 6 are configured to be coupled to each other by the clutch so as to be integrally rotatable.

The first base member 7 of the locking base 6 does not necessarily include the partition 76, and the first recess 74 and the second recess 75 may be continuous. In this case, instead of the rotation shaft 9B, a left end portion of the torsion bar 4A may penetrate the locking base 6 and the synchronized gear 14, and be rotatably supported by the cover member 17 of the lock unit 1D.

Figure 17:
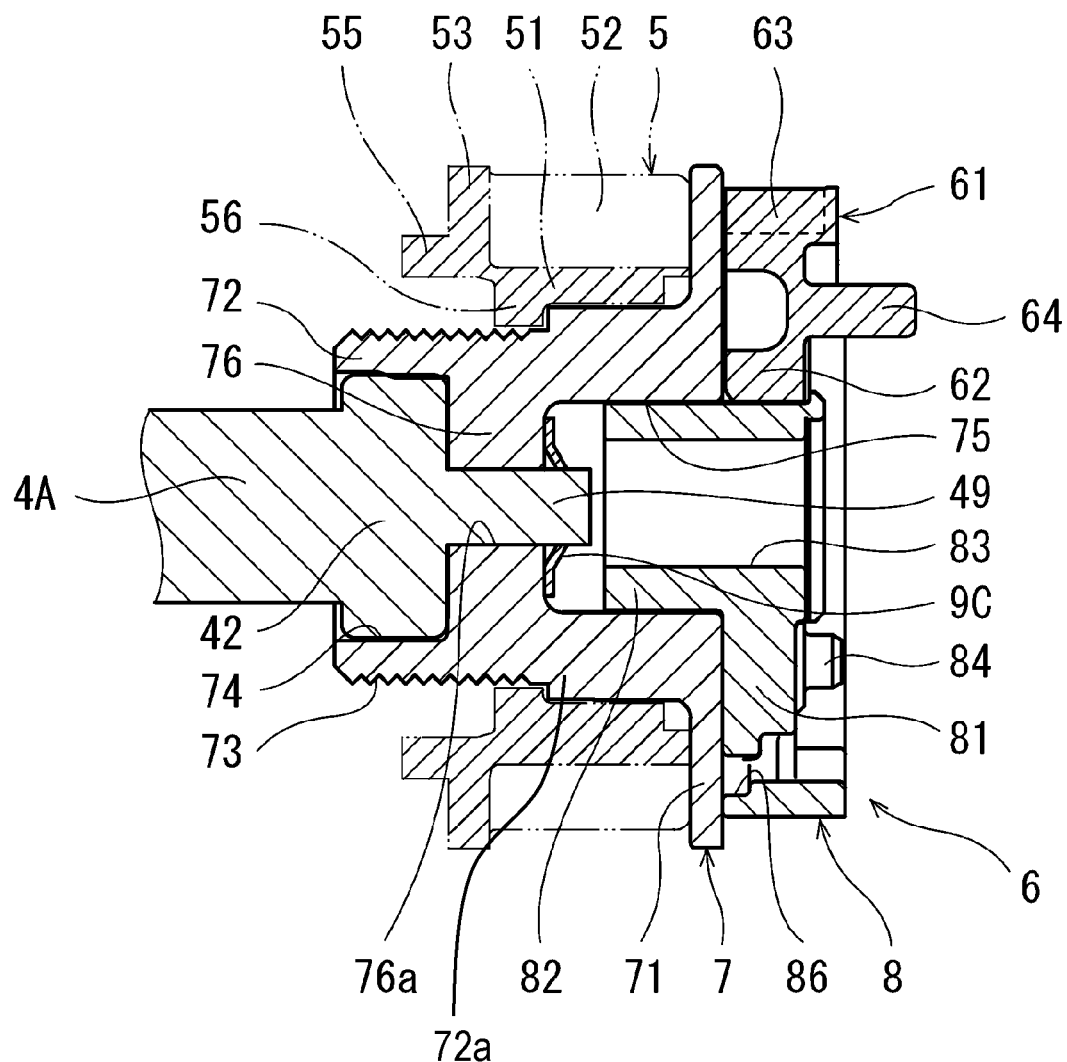
FIG. 17 is a cross-sectional view corresponding to FIG. 14 of the locking base to which a torsion bar according to a first modification is assembled.

As shown in a first modification illustrated in FIG. 17, the first recess 74 and the second recess 75 may be continuous with a connecting hole 76a formed in the partition 76. In this case, the torsion bar 4A may be assembled to the first base member 7 by providing a convex portion 49 that protrudes through the connecting hole 76a into the second recess 75 at the left end portion of the torsion bar 4A, and attaching a push nut 9C to the convex portion 49.

The rotation shaft 9B may be provided integrally with the second base member 8. In this case, the second base member 8 may be provided with a recess recessed from a distal end surface of the fitting protrusion 82.

The rib 55, around which the impact energy absorbing wire 4B is wound, is provided in the drive wheel 5 in the above embodiment, however the rib 55 may be provided in the winding drum 3. Alternatively, the rib 55 may be provided separately from the drive wheel 5, and the separate member may be attached to, for example, the protruding portion 72 of the first base member 7 of the locking base 6 without being rotatable relative to the protruding portion 72. In this case, the separate member may be sandwiched between the drive wheel 5 and the first end surface 31 of the winding drum 3.

Figure 18:
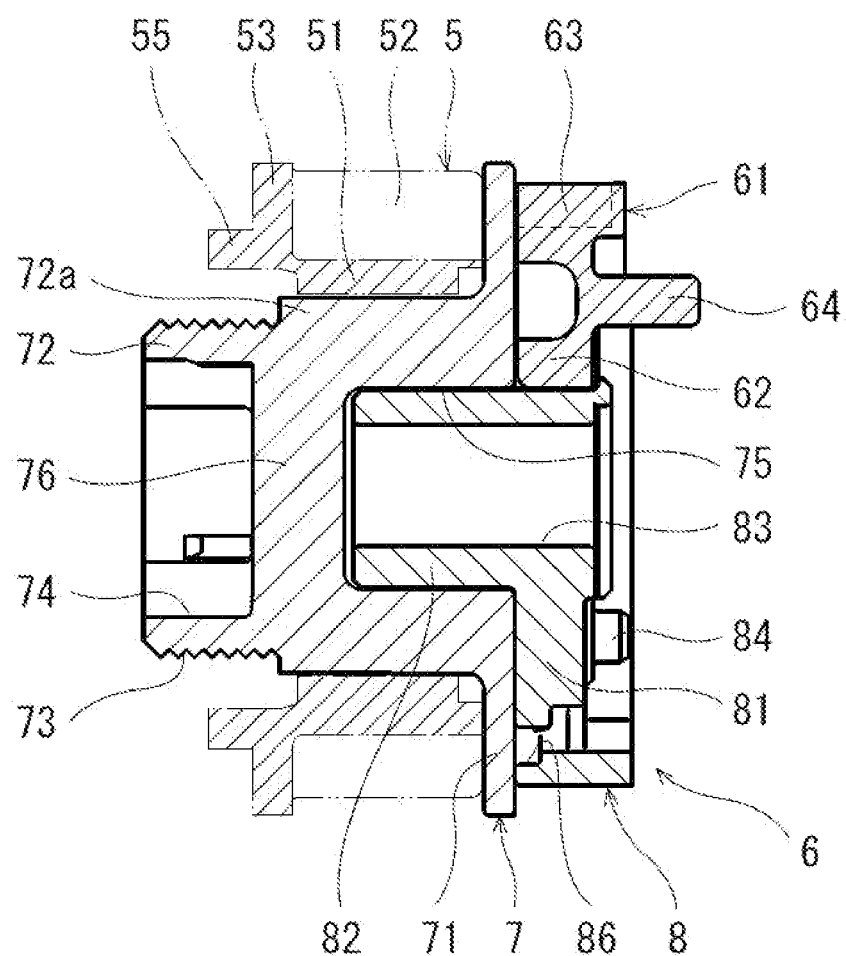
FIG. 18 is a cross-sectional view corresponding to FIG. 13 of the locking base according to a second modification.

As show in a second modification illustrated in FIG. 18, the proximal end portion 72a of the protruding portion 72 in the first base member 7 may extend to the right side (the tip side where the male screw 73 is provided), without providing an annular flange 56 on the inner peripheral surface of the main body portion 51 of the drive wheel 5. In this case, the stopper member 4C is configured to come into contact with the proximal end portion 72a, instead of the flange 56, and the stopper member 4C moves to the position where the stopper member 4C comes into contact with the proximal end portion 72a. Therefore, the stopper member 4C moves from a position where the stopper member 4C separates from the proximal end portion 72a of the protruding portion 72 to a position where the stopper member 4C comes into contact with the proximal end portion 72a, during the relative rotation of the winding drum 3 and the locking base 6, thereby restricting the relative rotation of the winding drum 3 and the locking base 6 to a predetermined amount. As a result, the stopper member 4C comes into contact with the proximal end portion 72a of the protruding portion 72, the stopper member 4C is easily prevented from being moved in the axial direction of the winding drum 3, and the relative rotation of the winding drum 3 and the locking base 6 is able to be restricted to a predetermined amount. However, with respect to FIG. 18, the right end of the proximal end portion 72a of the protruding portion 72 and the right edge of the fitting hole of the drive wheel 5 may be aligned, and the stopper member 4C may come into contact with both the proximal end portion 72a of the protruding portion 72 and the drive wheel 5.

Conclusion

As a first aspect, the present disclosure provides a seat belt retractor including: a housing including a first side wall and a second side wall facing each other; a winding drum configured to wind up a webbing, the winding drum being housed between the first side wall and the second side wall so as to be rotatable in a winding direction and a pull-out direction of the webbing, the winding drum having a center hole opened on a first end surface of the winding drum, the first end surface of the winding drum located on a side of the first side wall; a locking base disposed to face the first end surface of the winding drum; a torsion bar inserted into the center hole of the winding drum, the torsion bar including one end side, which is opposite to the locking base, coupled to the winding drum without being rotatable relative to the winding drum, and the other end side coupled to the locking base without being rotatable relative to the locking base, the torsion bar being configured to be plastically deformed in a case where a pull-out force of the webbing exceeds a predetermined value in a state where the locking base is prevented from rotating in the pull-out direction, and so as to absorb impact energy while allowing relative rotation between the winding drum and the locking base; a pretensioner including: a pretensioner casing attached to the first side wall; and a drive wheel attached to the locking base, the pretensioner being configured to rotate the winding drum in the winding direction via the drive wheel, the locking base, and the torsion bar, in an emergency of a vehicle; a lock member located in the locking base, the lock member being configured to engage with the first side wall or the pretensioner casing to prevent the locking base from being rotated in the pull-out direction, in the emergency of the vehicle; and a stopper member being held in the center hole of the winding drum without being rotatable relative to the winding drum and so as to be movable in an axial direction of the winding drum, the stopper member being screwed onto a male screw of the locking base, the stopper member being configured to define an allowable amount of relative rotation between the winding drum and the locking base in a case where the torsion bar absorbs the impact energy, in which the locking base includes a first base member to which the drive wheel is attached, and a second base member, the second base member being attached to the first base member on a side of the first base member opposite to the winding drum without being rotatable relative to the first base member, the second base member being configured to hold the lock member between the first base member and the second base member, the first base member includes: a disk-shaped first main body portion in which the drive wheel is disposed between the first main body portion and the first end surface of the winding drum; and a protruding portion protruding, from the first main body portion, in a second direction of the axial direction of the winding drum so as to penetrate the drive wheel, the second direction being a direction toward the second side wall, the male screw is formed on an outer circumferential surface of a distal end side of the protruding portion, the first base member include: a first recess recessed from a distal end surface of the protruding portion, the first recess being configured to couple to the torsion bar; and a second recess recessed from a surface of the first main body portion on a side opposite to the drive wheel, the second recess being coaxial with the first recess, and the second base member includes: a plate-shaped second main body portion that overlaps the first main body portion; and a fitting protrusion that protrudes, in the second direction, from the second main body portion, the fitting protrusion fitting into the second recess.

According to the above configuration, the locking base is divided into the first base member on which the male screw is formed and the second base member, and thus shapes of the first base member and the second base member can be simplified. Therefore, the locking base can be easily manufactured.

As a second aspect, according to the first aspect, the first base member may be formed of a material having a higher strength than the second base member. According to the configuration, the second base member can be formed of aluminum alloy or zinc alloy having a low specific gravity or formed of resin. Therefore, the second base member can be reduced in weight.

As a third aspect, according to the first aspect or the second aspect, the first base member may include a partition that separates the first recess and the second recess. According to the configuration, the first recess and the second recess are bottomed, and thus it is possible to avoid the shape of the first base member having a deep recess or a thick portion. Therefore, the first base member can be formed by, for example, forging.

As a fourth aspect, according to the third aspect, the second recess may have a depth overlapping the drive wheel in the axial direction of the winding drum, and there may be a space between a distal end of the fitting protrusion of the second base member and the partition of the first base member. According to the configuration, a cavity is formed in the locking base, and thus volumes of the first base member and the second base member can be reduced. Accordingly, the locking base can be reduced in weight.

As a fifth aspect, according to any one of the first to fourth aspects, the second base member may be provided with an engagement hole that is coaxial with the fitting protrusion and that is opened in a first direction opposite to the second direction, and the seat belt retractor may further include a rotation shaft engaged with the engagement hole, the rotation shaft being formed of resin, and a cover member configured to rotatably support the rotation shaft. According to the configuration, the seat belt retractor can be reduced in weight as compared with a case where the rotation shaft is formed of metal.

As a sixth aspect, according to any one of the first to fifth aspects, the second main body portion may include at least one crimping protrusion that protrudes from the second main body portion in the second direction, the first main body portion may be provided with at least one through hole through which the at least one crimping protrusion is inserted, and a portion of the crimping protrusion, which protrudes from the through hole, may be crimped to have a larger diameter than the through hole. According to the configuration, the relative movement between the first base member and the second base member in the axial direction of the winding drum can be easily prevented. In addition, the first base member and the second base member are integrated with each other after the crimping, and thus the assembly is also easy.

As a seventh aspect, according to according to any one of the first aspect to the sixth aspect, in which the stopper member may be prevented from being moved in the axial direction of the winding drum by coming into contact with the drive wheel. According to this configuration, the stopper member comes into contact with the drive wheel, the stopper member is easily prevented from being moved in the axial direction of the winding drum, and the relative rotation between the winding drum and the locking base is able to be restricted to a predetermined amount.

As a eighth aspect, according to according to any one of the first aspect to the seventh aspect, in which the protruding portion may include, at a proximal side of the male screw, a proximal end portion protruding radially outward more than the male screw, and the stopper member may be prevented from being moved in the axial direction of the winding drum by coming into contact with the proximal end portion of the protruding portion. According to this configuration, the stopper member comes into contact with the proximal end portion of the protruding portion, the stopper member is easily prevented from being moved in the axial direction of the winding drum, and the relative rotation between the winding drum and the locking base is able to be restricted to a predetermined amount.

What is claimed is:
1. A seat belt retractor comprising:
a housing including a first side wall and a second side wall facing each other;
a winding drum configured to wind up a webbing, the winding drum being housed between the first side wall and the second side wall so as to be rotatable in a winding direction and a pull-out direction of the web- bing, the winding drum having a center hole opened on a first end surface of the winding drum, the first end surface of the winding drum located on a side of the first side wall;

a locking base disposed to face the first end surface of the winding drum;

a torsion bar inserted into the center hole of the winding drum, the torsion bar including one end side, which is opposite to the locking base, coupled to the winding drum without being rotatable relative to the winding drum, and the other end side coupled to the locking base without being rotatable relative to the locking base, the torsion bar being configured to be plastically deformed in a case where a pull-out force of the webbing exceeds a predetermined value in a state where the locking base is prevented from rotating in the pull-out direction, so as to absorb impact energy while allowing relative rotation between the winding drum and the locking base;

a pretensioner including: a pretensioner casing attached to the first side wall; and a drive wheel attached to the locking base, the pretensioner being configured to rotate the winding drum in the winding direction via the drive wheel, the locking base, and the torsion bar, in an emergency of a vehicle;

a lock member located in the locking base, the lock member being configured to engage with the first side wall or the pretensioner casing to prevent the locking base from being rotated in the pull-out direction, in the emergency of the vehicle; and a stopper member being held in the center hole of the winding drum without being rotatable relative to the winding drum and so as to be movable in an axial direction of the winding drum, the stopper member being screwed onto a male screw of the locking base, the stopper member being configured to define an allowable amount of relative rotation between the winding drum and the locking base in a case where the torsion bar absorbs the impact energy, wherein the locking base includes a first base member to which the drive wheel is attached, and a second base member, the second base member being attached to the first base member on a side of the first base member opposite to the winding drum without being rotatable relative to the first base member, the second base member being configured to hold the lock member between the first base member and the second base member, the first base member includes:
  a disk-shaped first main body portion in which the drive wheel is disposed between the first main body portion and the first end surface of the winding drum; and
  a protruding portion protruding, from the first main body portion, in a second direction of the axial direction of the winding drum so as to penetrate the drive wheel, the second direction being a direction toward the second side wall, the male screw is formed on an outer circumferential surface of a distal end side of the protruding portion, the first base member further includes:
  a first recess recessed from a distal end surface of the protruding portion, the first recess being configured to couple to the torsion bar; and
  a second recess recessed from a surface of the first main body portion on a side opposite to the drive wheel, the second recess being coaxial with the first recess, and the second base member includes:
  a plate-shaped second main body portion that overlaps the first main body portion; and
  a fitting protrusion that protrudes, in the second direction, from the second main body portion, the fitting protrusion fitting into the second recess.

2. The seat belt retractor according to claim 1,
wherein the first base member is formed of a material having a higher strength than the second base member.

3. The seat belt retractor according to claim 1,
wherein the first base member includes a partition that separates the first recess and the second recess.

4. The seat belt retractor according to claim 3,
wherein the second recess has a depth overlapping the drive wheel, in the axial direction of the winding drum, and there is a space between a distal end of the fitting protrusion of the second base member and the partition of the first base member.

5. The seat belt retractor according to claim 1,
wherein the second base member is provided with an engagement hole that is coaxial with the fitting protrusion and that is opened in a first direction opposite to the second direction, and the seat belt retractor further includes:
  a rotation shaft engaged with the engagement hole, the rotation shaft being formed of resin; and
  a cover member configured to rotatably support the rotation shaft.

6. The seat belt retractor according to claim 1,
wherein the second main body portion includes at least one crimping protrusion that protrudes from the second main body portion in the second direction, the first main body portion is provided with at least one through hole through which the at least one crimping protrusion is inserted, and a portion of the crimping protrusion, which protrudes from the through hole, is crimped to have a larger diameter than the through hole.

7. The seat belt retractor according to claim 1,
wherein the stopper member is prevented from being moved in the axial direction of the winding drum by coming into contact with the drive wheel.

8. The seat belt retractor according to claim 1,
wherein the protruding portion includes, at a proximal side of the male screw, a proximal end portion protruding radially outward more than the male screw, and the stopper member is prevented from being moved in the axial direction of the winding drum by coming into contact with the proximal end portion of the protruding portion.

* * * * *